(12) United States Patent
Chung et al.

(10) Patent No.: US 8,750,257 B2
(45) Date of Patent: Jun. 10, 2014

(54) METHOD AND APPARATUS FOR PROVIDING DOWNLINK REFERENCE SIGNAL TRANSMISSION POWER INFORMATION IN A WIRELESS COMMUNICATION SYSTEM THAT SUPPORTS MULTIPLE ANTENNAS

(75) Inventors: Jae Hoon Chung, Anyang-si (KR); Moon Il Lee, Anyang-si (KR); Min Seok Noh, Anyang-si (KR); Hyun Soo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 13/394,327

(22) PCT Filed: Oct. 12, 2010

(86) PCT No.: PCT/KR2010/006974
§ 371 (c)(1),
(2), (4) Date: Mar. 5, 2012

(87) PCT Pub. No.: WO2011/046349
PCT Pub. Date: Apr. 21, 2011

(65) Prior Publication Data
US 2012/0188988 A1    Jul. 26, 2012

Related U.S. Application Data

(60) Provisional application No. 61/250,579, filed on Oct. 12, 2009.

(51) Int. Cl.
*H04B 7/216* (2006.01)
*H04B 7/26* (2006.01)
*H04B 1/7073* (2011.01)

(52) U.S. Cl.
CPC ............ *H04B 7/2668* (2013.01); *H04B 1/7073* (2013.01)
USPC .......................................... 370/335; 370/441

(58) Field of Classification Search
CPC ........................... H04B 7/2668; H04B 1/7073
USPC ......... 370/208, 335–336, 342, 345, 350, 441, 370/465, 479, 498, 503, 509–514
See application file for complete search history.

(56) References Cited

U.S. PATENT DOCUMENTS

2009/0129259 A1   5/2009  Malladi et al.
2009/0180435 A1*  7/2009  Sarkar ........................ 370/330

(Continued)

OTHER PUBLICATIONS

3rd Generation Partnership Project (3GPP); "Technical Specification Group Radio Access Network; Evolved Universal Terrestrial Radio Access (E-UTRA); Physical Channels and Modulation (Release 8)", 3GPP TS 36.211 V8.8.0, Sep. 2009.

(Continued)

*Primary Examiner* — Kevin Mew
(74) *Attorney, Agent, or Firm* — Lee, Hong, Degerman, Kang & Waimey

(57) ABSTRACT

A method and an apparatus for providing downlink reference signal transmission power information in a wireless communication system that supports multiple antennas, where one embodiment of the method includes: a step of mapping a main synchronous signal onto a predetermined OFDM symbol of a downlink pilot time slot (DwPTS) subframe; a step of mapping, in a code division multiplexing manner, a demodulation reference signal over two or more OFDM symbols containing the predetermined OFDM symbol in the DwPTS subframe; a step of transmitting the DwPTS subframe to which the main synchronous signal and the demodulation reference signal are mapped; and a step of transmitting information on the transmission power for transmitting the demodulation reference signal mapped onto the predetermined OFDM symbol.

15 Claims, 16 Drawing Sheets

(56) References Cited

U.S. PATENT DOCUMENTS

| | | | |
|---|---|---|---|
| 2011/0194523 A1* | 8/2011 | Chung et al. | 370/329 |
| 2011/0274205 A1* | 11/2011 | Lee et al. | 375/295 |
| 2011/0292825 A1* | 12/2011 | Lee et al. | 370/252 |
| 2011/0292847 A1* | 12/2011 | Yoon et al. | 370/280 |
| 2012/0076039 A1* | 3/2012 | Kwon et al. | 370/252 |
| 2012/0113948 A1* | 5/2012 | Kwon et al. | 370/329 |
| 2012/0155338 A1* | 6/2012 | Noh et al. | 370/280 |
| 2012/0155414 A1* | 6/2012 | Noh et al. | 370/329 |

OTHER PUBLICATIONS

B. Classon et al., "Overview of UMTS Air-Interface Evolution", IEEE 64th Vehicular Technology Conference, Sep. 2006.

* cited by examiner (a)

R0, R1, R2, R3 : CRS
C : Control information
D : Data
01 : DMRS (CDM-T)

▨ : DMRS transmission power α
☐ : DMRS transmission power β
☐ : Orthogonal covering

METHOD AND APPARATUS FOR PROVIDING DOWNLINK REFERENCE SIGNAL TRANSMISSION POWER INFORMATION IN A WIRELESS COMMUNICATION SYSTEM THAT SUPPORTS MULTIPLE ANTENNAS

CROSS-REFERENCE TO RELATED APPLICATIONS

This application is the National Stage filing under 35 U.S.C. 371 of International Application No. PCT/KR2010/006974, filed on Oct. 12, 2010, which claims the benefit of U.S. Provisional Application Ser. No. 61/250,579, filed on Oct. 12, 2009, the contents of which are all incorporated by reference herein in their entirety.

TECHNICAL FIELD

The present invention relates to a wireless communication system, and more particularly, to a method and apparatus for providing transmission power information on a downlink reference signal in a multi-antenna supporting wireless communication system.

BACKGROUND ART

MIMO (multiple input multiple output) system means the system that improvise transmission/reception efficiency of data using multiple transmitting antennas and multiple receiving antennas. The MIMO technology may be categorized into a spatial diversity scheme and a spatial multiplexing scheme. Since the spatial diversity scheme raises transmission reliability or widens a cell radius through diversity gain, it is suitable for data transmission to a user equipment that moves at high speed. The spatial multiplexing scheme transmits different data simultaneously, thereby raising a data transmission rate without increasing a bandwidth of system.

In MIMO system, each transmitting antenna has an independent data channel. A transmitting antenna may mean a virtual antenna or a physical antenna. A receiver receives data transmitted from each transmitting antenna in a manner of estimating a channel for the corresponding transmitting antenna. Channel estimation means a process for reconstructing a received signal by compensating for distortion of a signal caused by fading. In this case, the fading indicates an effect that strength of a signal rapidly fluctuates due to multipath-time delay in a wireless communication system environment. For the channel estimation, a reference signal known to both a transmitter and a receiver is necessary. The reference signal may be simply named RS or a pilot in accordance with an applicable standard.

Downlink reference signal is a pilot signal for coherent demodulation of such a channel as PDSCH (Physical Downlink Shared CHannel), PCFICH (Physical Control Format Indicator CHannel), PHICH (Physical Hybrid Indicator CHannel), PDCCH (Physical Downlink Control CHannel) and the like. The downlink reference signal may be categorized into a common reference signal (CRS) shared by al user equipments in a cell and a dedicated reference signal (DRS) for a specific user equipment only. The common reference signal may be called a cell-specific reference signal. And, the dedicated reference signal may be called a user equipment-specific (UE-specific) reference signal or a demodulation reference signal (DMRS).

In multi-antenna transmission, for correct operation in a receiving side, DMRS is required to be transmitted in a manner of being multiplexed (i.e., discriminated) for each layer (or antenna port). As a resource for multiplexing DMRS, at least one of time resource, frequency resource and code resource is usable.

DISCLOSURE OF THE INVENTION

Technical Task

When DMRS for at least one layer is multiplexed using orthogonal cover code, a prescribed DMRS may have transmission power lower than that of another DMRS in accordance with transmission of another signal (e.g., sync signal). In this case, orthogonality of the DMRS multiplexed by the orthogonal cover code may not be maintained. Hence, a receiving side may not be able to correctly perform channel estimation using DMRS. The technical task of the present invention is to provide a method of providing DMRS transmission power information to enable accurate and efficient channel estimation using DMRS.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of providing demodulation reference signal transmission power information according to one embodiment of the present invention may include the steps of mapping a primary synchronization signal to a prescribed OFDM symbol of DwPTS (downlink pilot time slot) subframe, mapping the demodulation reference signal across at least 2 OFDM symbols including the prescribed OFDM symbol in the DwPTS subframe by a code division multiplexing scheme, transmitting the DwPTS subframe to which the primary synchronization signal and the demodulation reference signal are mapped, and transmitting transmission power information of the demodulation reference signal mapped to the prescribed OFDM symbol.

Preferably, the primary synchronization signal may be power boosted.

Preferably, the demodulation reference signal on the prescribed OFDM symbol may be power deboosted.

Preferably, the transmission power information of the demodulation reference signal may include at least one of a transmission power level of the demodulation reference signal on the prescribed OFDM symbol, a difference value between a transmission power level of the demodulation reference signal on the prescribed OFDM symbol and a transmission power level of the demodulation reference signal on the rest of the OFDM symbol, and a ratio of the transmission power level of the demodulation reference signal on the prescribed OFDM symbol to the transmission power level of the demodulation reference signal on the rest of the OFDM symbol.

Preferably, the code division multiplexing may use an orthogonal cover code (OCC) having a length 2 or more.

Preferably, the prescribed OFDM symbol may include a $3^{rd}$ OFDM symbol of the DwPTS subframe.

To further achieve these and other advantages and in accordance with the purpose of the present invention, a method of acquiring channel information using a demodulation reference signal according to another embodiment of the present invention may include the steps of receiving DwPTS (downlink pilot time slot) subframe having the demodulation reference signal mapped by a code division multiplexing scheme across at least 2 OFDM symbols including a prescribed OFDM symbol to which a primary synchronization signal is mapped, receiving transmission power information of the demodulation reference signal mapped to the prescribed OFDM symbol, despreading the received demodulation reference signal based on the transmission power information of the demodulation reference signal, and acquiring the channel information from the despread demodulation reference signal.

Preferably, the demodulation reference signal despreading step may include the step of normalizing a power of the demodulation reference signal mapped to the at least 2 OFDM symbols from the transmission power information of the demodulation reference signal.

Preferably, the primary synchronization signal may be power boosted.

Preferably, the demodulation reference signal on the prescribed OFDM symbol may be power deboosted.

Preferably, the transmission power information of the demodulation reference signal may include at least one of a transmission power level of the demodulation reference signal on the prescribed OFDM symbol, a difference value between a transmission power level of the demodulation reference signal on the prescribed OFDM symbol and a transmission power level of the demodulation reference signal on the rest of the OFDM symbol, and a ratio of the transmission power level of the demodulation reference signal on the prescribed OFDM symbol to the transmission power level of the demodulation reference signal on the rest of the OFDM symbol.

Preferably, the code division multiplexing may use an orthogonal cover code (OCC) having a length 2 or more.

Preferably, the prescribed OFDM symbol may include a $3^{rd}$ OFDM symbol of the DwPTS subframe.

To further achieve these and other advantages and in accordance with the purpose of the present invention, a base station, which provides demodulation reference signal transmission power information, according to another embodiment of the present invention may include a receiving module receiving an uplink signal from a user equipment, a transmitting module transmitting a downlink signal to the user equipment, and a processor connected to the receiving module and the transmitting module, the processor controlling the base station including the receiving module and the transmitting module, the processor configured to map a primary synchronization signal to a prescribed OFDM symbol of DwPTS (downlink pilot time slot) subframe, the processor configured to map the demodulation reference signal across at least 2 OFDM symbols including the prescribed OFDM symbol in the DwPTS subframe by a code division multiplexing scheme, the processor configured to transmit the DwPTS subframe to which the primary synchronization signal and the demodulation reference signal are mapped and transmission power information of the demodulation reference signal mapped to the prescribed OFDM symbol via the transmitting module.

To further achieve these and other advantages and in accordance with the purpose of the present invention, a user equipment, which acquires channel information using a demodulation reference signal, according to a further embodiment of the present invention may include a receiving module receiving a downlink signal from a base station, a transmitting module transmitting an uplink signal to the user equipment, and a processor connected to the receiving module and the transmitting module, the processor controlling the user equipment including the receiving module and the transmitting module, the processor configured to receive DwPTS (downlink pilot time slot) subframe having the demodulation reference signal mapped by a code division multiplexing scheme across at least 2 OFDM symbols including a prescribed OFDM symbol to which a primary synchronization signal is mapped via the receiving module, the processor configured to receive transmission power information of the demodulation reference signal mapped to the prescribed OFDM symbol via the receiving module, the processor configured to despread the received demodulation reference signal based on the transmission power information of the demodulation reference signal, the processor configured to acquire the channel information from the despread demodulation reference signal.

The above-mentioned general description of the present invention and the following details of the present invention are exemplary and may be provided for the additional description of the invention disclosed in claims.

Advantageous Effect

According to the present invention, even if transmission power of DMRS is affected by a transmission of another signal, DMRS transmission power information may be provided to enable accurate and efficient channel estimation.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 9 is a diagram of patterns for CRS and DRS patterns defined by the conventional 3GPP LTE system to be mapped to a DL resource block.

BEST MODE FOR INVENTION

Figure 1:
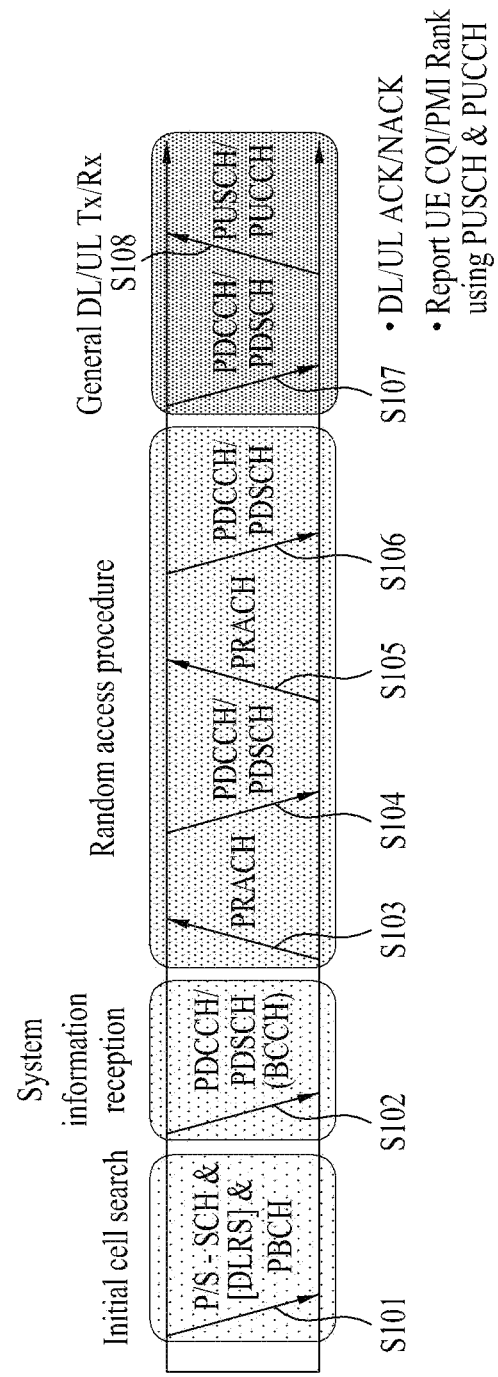
FIG. 1 is a diagram for explaining physical channels used for 3GPP LTE system and a general signal transmitting method using the physical channels.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this disclosure, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A terminology 'base station' may be used as a concept of including a cell or sector in this disclosure. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMANii-OFDMA reference system) and advanced IEEE 802.16m standard (e.g., WirelessMAN-OFDMA advanced system). For clarity, the following description mainly concerns 3GPP LTE system or 3GPP LTE-A system, by which the technical idea of the present invention may be non-limited.

In a mobile communication system, a user equipment may receive information in downlink and transmit information in uplink as well. Informations transmitted or received by the user equipment may include various kinds of data and control informations. In accordance with types and usages of the informations transmitted or received by the user equipment, various physical channels may exist.

FIG. 1 is a diagram to describe physical channels used for 3GPP LTE system and a general signal transmitting method using the physical channels.

First of all, a user equipment performs initial cell search such as synchronizing with a base station when the user equipment newly enters a cell or a power of the user equipment is turned on again (S101). To this end, the user equipment synchronizes with the base station by receiving a primary synchronization channel (P-SCH) and a secondary synchronization channel (S-SCH) from the base station, and may acquire such information as cell ID and the like. Afterwards, the user equipment may acquire broadcast information within the cell by receiving a physical broadcast channel from the base station. Meanwhile, the user equipment receives a downlink (DL) reference signal (RS) in the step of the initial cell search and may be then able to check a downlink channel state.

Having finished the initial cell search, the user equipment may acquire further detailed system information by receiving a physical downlink control channel (PDCCH) and a physical downlink shared channel (PDSCH) in accordance with the physical downlink control channel information (S102).

Meanwhile, if the user equipment initially accesses the base station or there is no radio resource for signal transmission, the user equipment may perform a random access procedure on the base station (S103 to S106). To this end, the user equipment transmits a specific sequence as a preamble on a physical random access channel (PRACH) (S103) and may then receive a response message to the random access through the PDCCH and the PDSCH corresponding to the PDCCH (S104). In case of a contention based random access except a case of handover, such a contention resolution procedure as a physical random access channel transmission S105 and a PDCCH/PDSCH reception S106 may be performed additionally.

Having performed the aforementioned steps, the user equipment may perform such a general UUDL signal transmitting step as a PDCCH/PDSCH reception (S107) and a PUSCH/PUCCH (physical uplink shared channel/physical uplink control channel) transmission (S108). In this case, the control information transmitted from the user equipment to the base station or received from the base station by the user equipment in uplink may include DL/UL (downlink/uplink) ACK/NACK signals, a channel quality indicator (hereinafter abbreviated CQI), a precoding matrix index (hereinafter abbreviated PMI), a rank indicator (hereinafter abbreviated RI) and the like. In case of the 3GPP LTE system, the user equipment may transmit control the aforementioned information such as CQI, PMI, RI and the like on the PUSCH and/or the PUCCH.

Figure 2:
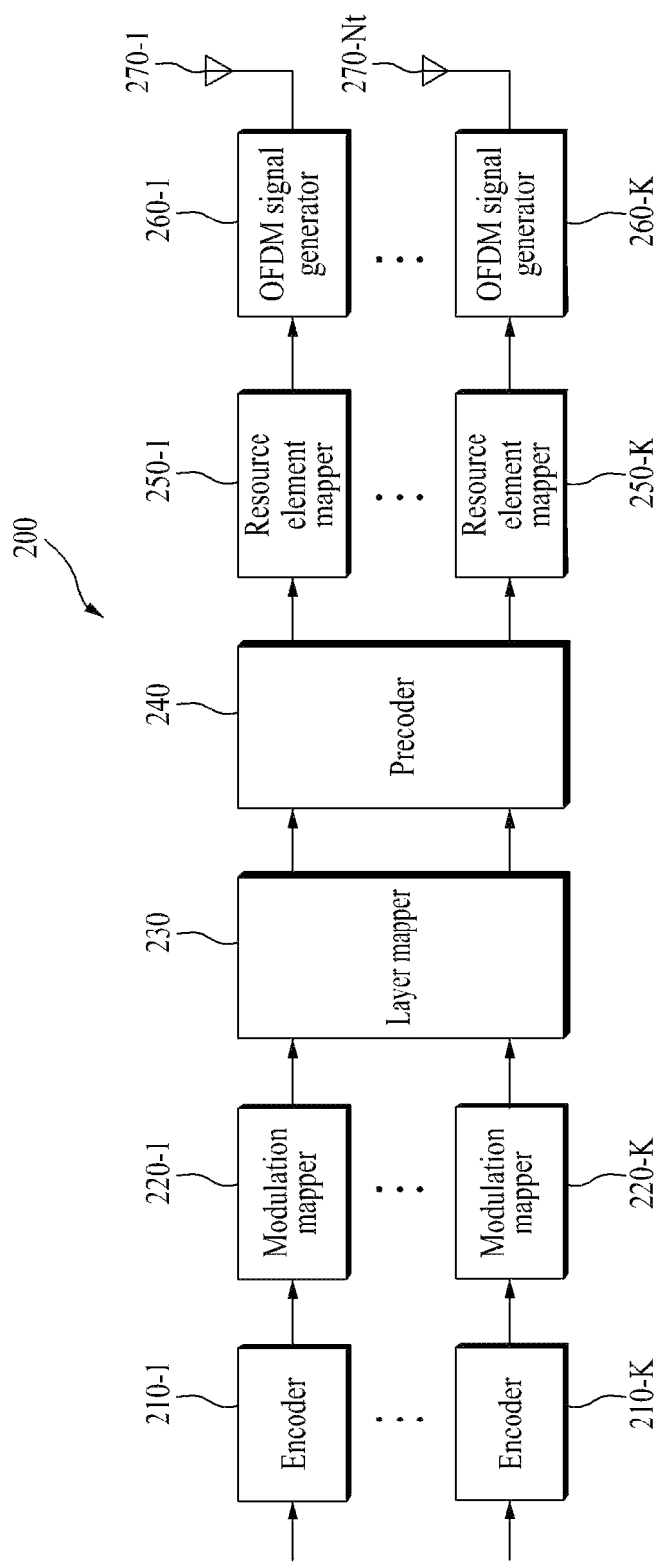
FIG. 2 is a block diagram for a structure of a transmitter including multiple antennas.

FIG. 2 is a block diagram for a structure of a transmitter including multiple antennas.

Referring to FIG. 2, a transmitter 200 includes encoders 210-1 to 210-K, modulation mappers 220-1 to 220-K, a layer mappers 230, a precoder 240, resource element mappers 250-1 to 250-K, and OFDM signal generators 260-1 to 260-K. And, the transmitter 200 includes Nt transmitting antennas 270-1 to 270-Nt.

Each of the encoders 210-1 to 210-K encodes an inputted data by a predetermined coding scheme and then generates a coded data. Each of the modulation mappers 220-1 to 220-K maps the coded data to a modulation symbol that represents a position on a signal constellation. No limitation is put on a modulation scheme. And, the modulation scheme may include m-PSK (m-phase shift keying) or m-QAM (m-quadrature amplitude modulation). For instance, the m-PSK may include one of BPSK, QPSK and 8-PSK. For instance, the m-QAM may include one of 16-QAM, 64-QAM and 256-QAM.

The layer mapper 230 defines a layer of a modulation symbol to enable the precoder 240 to distribute an antenna-specific symbol to the path of each of the antennas. In this case, the layer is defined as an information path inputted to the precoder 240. And, the information path before the precoder 240 may be called a virtual antenna or a layer.

The precoder 240 outputs an antenna-specific symbol by processing the modulation symbol by MIMO scheme according to the multiple transmitting antennas 270-1 to 270-Nt. The precoder 240 distributes a specific symbol to each of the resource element mappers 250-1 to 250-K on the path of the corresponding antenna. Each information path sent by the precoder 240 to one antenna may be called a stream. This may be regarded as a physical antenna.

Each of the resource element mappers 250-1 to 250-K allocates the antenna-specific symbol to a proper resource element and multiplexes it in accordance with a user. Each of the OFDM signal generators 260-1 to 260-K outputs OFDM symbol by modulating the antenna-specific symbol by OFDM scheme. Each of the OFDM signal generators 260-1 to 260-K may be able to perform IFFT (inverse fast Fourier transform) on the antenna-specific symbol. And, a cyclic prefix (CP) may be inserted in a time-domain symbol on which IFFT is performed. The CP is the signal inserted in a guard interval to remove inter-symbol interference due to the multiple paths in OFDM transmission scheme. And, OFDM symbol is transmitted via each of the transmitting antenna 270-1 to 270-Nt.

Downlink (DL) radio frame structures are described with reference to FIG. 3 and FIG. 4 as follows.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a Type-1 radio frame structure applicable to FDD (frequency division duplex) and a Type-2 radio frame structure applicable to TDD (time division duplex) are supported.

Figure 3:
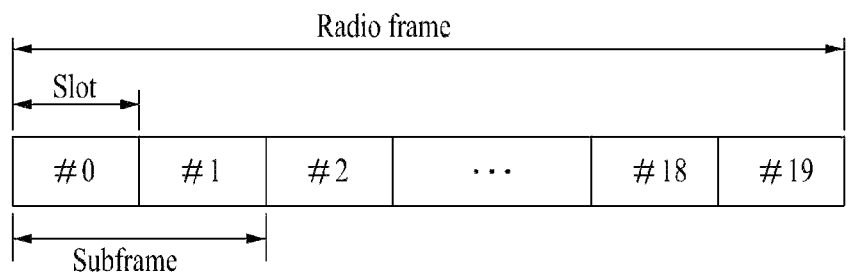
FIG. 3 is a diagram for a structure of a downlink radio frame of Type 1.

FIG. 3 is a diagram for a structure of a downlink radio frame of Type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

Figure 4:
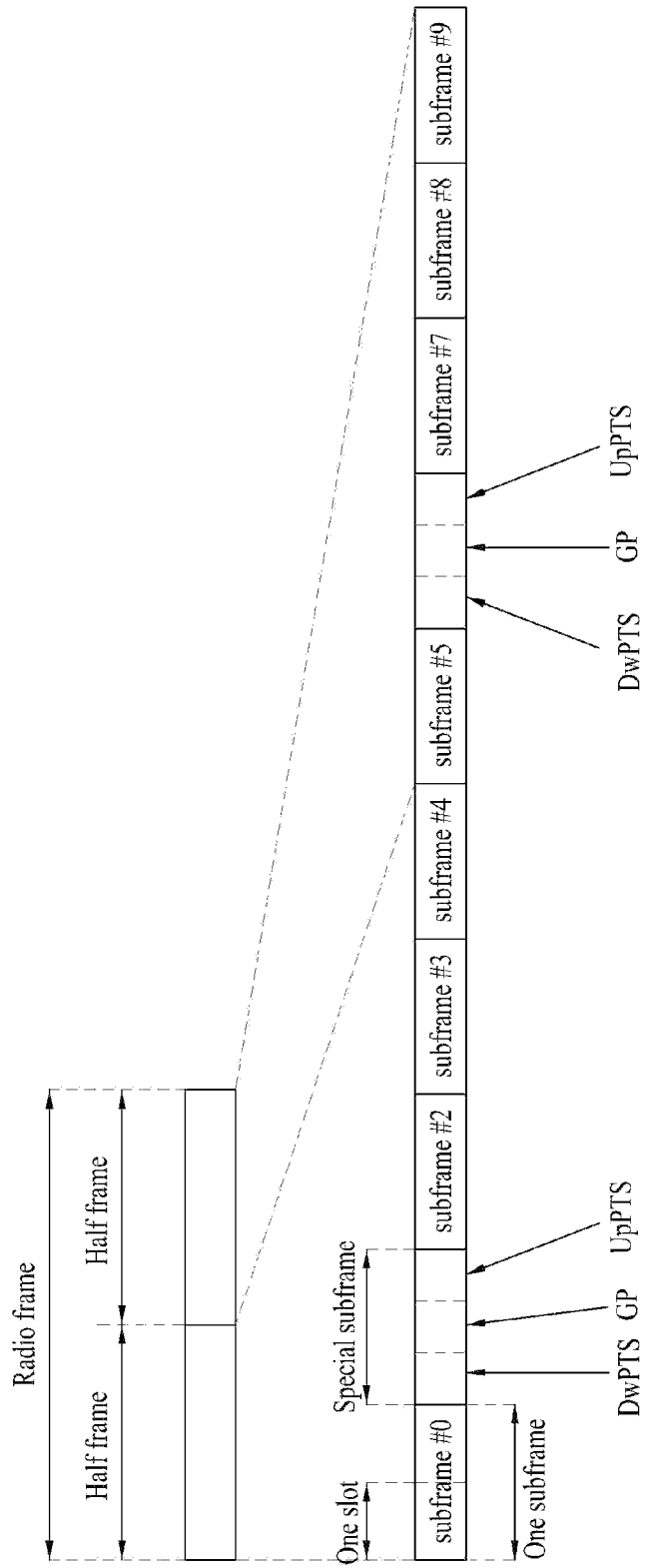
FIG. 4 is a diagram for a structure of a downlink radio frame of Type 2.

FIG. 4 is a diagram for a structure of a downlink radio frame of Type 2. Type-2 radio frame includes 2 half frames. Each of the half frames includes 5 subframes. The Subframes may be categorized into a general subframe and a special subframe. The special frame is the subframe that includes 3 fields of DwPTS (downlink pilot time slot), GP (gap period) and UpPTS (uplink pilot time slot). Although lengths of the 3 fields may be individually settable, the total length of the 3 fields should be set to 1 ms. One subframe includes 2 slots. In particular, one subframe includes 2 slots irrespective of the type of the radio frame.

The above-described structures of the radio frame are just exemplary. And, the number of subframes included in a radio frame, the number of slots included in the subframe and the number of symbols included in the slot may be modified in various ways.

Figure 5:
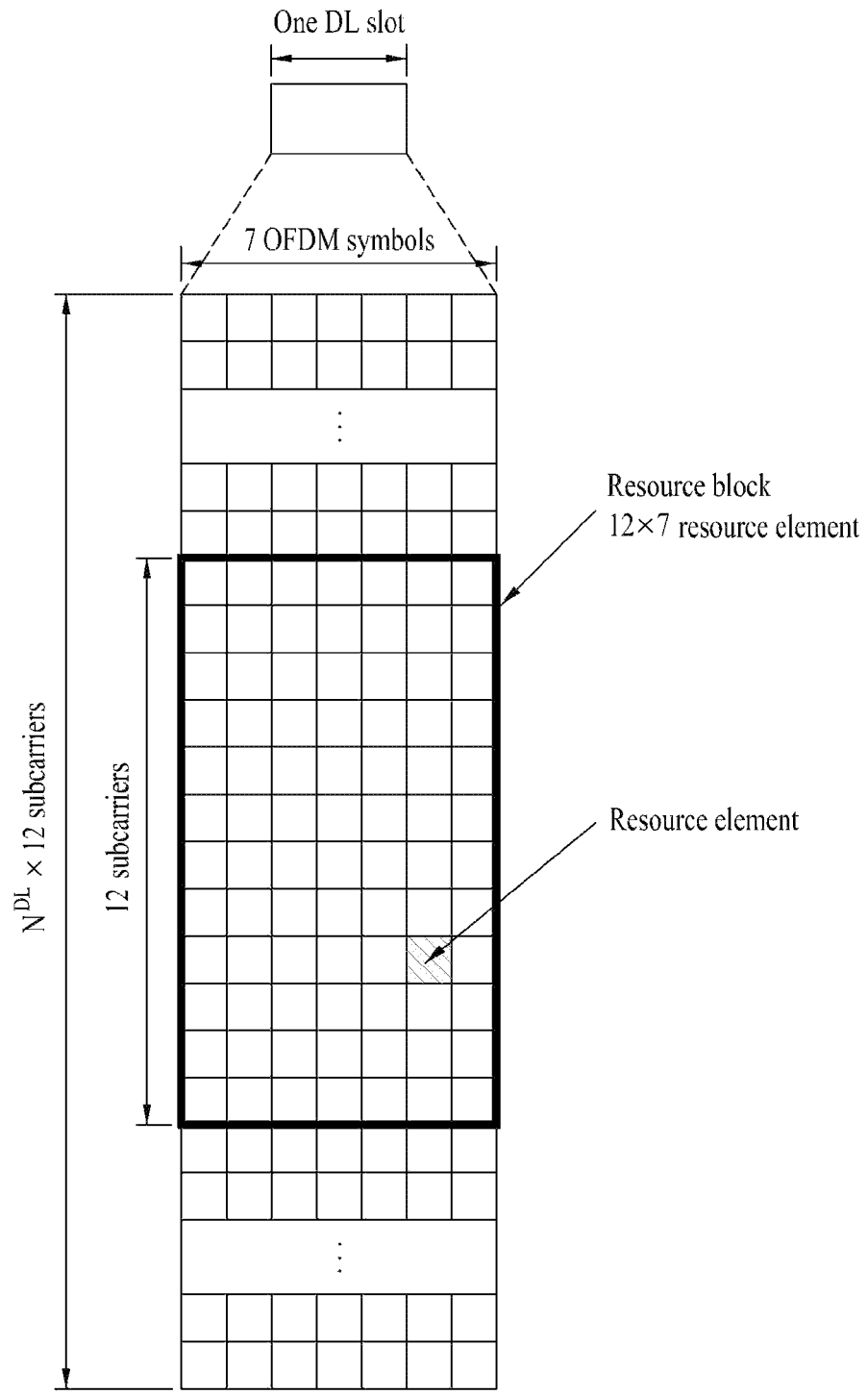
FIG. 5 is a diagram for one example of a resource grid for a downlink slot.

FIG. 5 is a diagram for one example of a resource grid for a downlink (DL) slot. This shows the case that OFDM symbol includes a normal CP. Referring to FIG. 5, a DL slot includes a plurality of OFDM symbols in time domain and a plurality of resource blocks (RBs) in frequency domain. In this case, one DL slot may include 7 OFDM symbols and one resource block (RB) may include 12 subcarriers, by which the present invention may be non-limited. Each element on a resource grid may be named a resource element (hereinafter abbreviated RE). For instance, a resource element a (k, I) becomes a resource element situated at $k^{th}$ subcarrier and $1^{st}$ OFDM symbol. In case of a normal CP, one resource block includes 12×7 resource elements (cf. 12×6 resource elements included in case of an extended CP). Since an interval of each subcarrier is 15 kHz, one resource block may include about 180 kHz in frequency domain. $N^{DL}$ indicates the number of resource blocks included in a DL slot. And, the value of the $N^{DL}$ may depend on a DL transmission bandwidth set by the scheduling of a base station.

Figure 6:
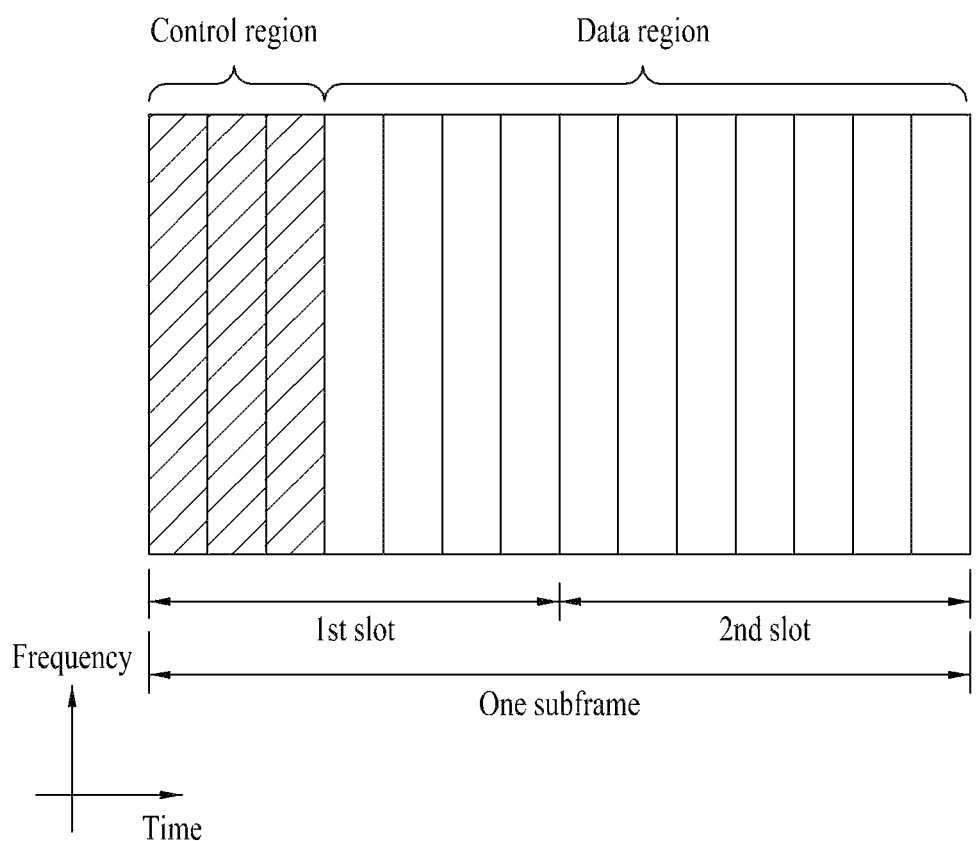
FIG. 6 is a diagram for a structure of a downlink subframe.

FIG. 6 is a diagram for a structure of a downlink (DL) subframe. Maximum 3 OFDM symbols (e.g., 1 symbol, 2 symbols, and 3 symbols) situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission. Control information carried on PDCCH may be called downlink control information (DCI). The DCI may include UL or DL scheduling information or a UL transmission power control command for a random UE (user equipment) group. The PDCCH may include transmission format and resource allocation information of DL-SCH (downlink shared channel), resource allocation information on UL-SCH (uplink shared channel), paging information on PCH (paging channel), system information on DL-SCH, resource allocation of such an upper layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 7:
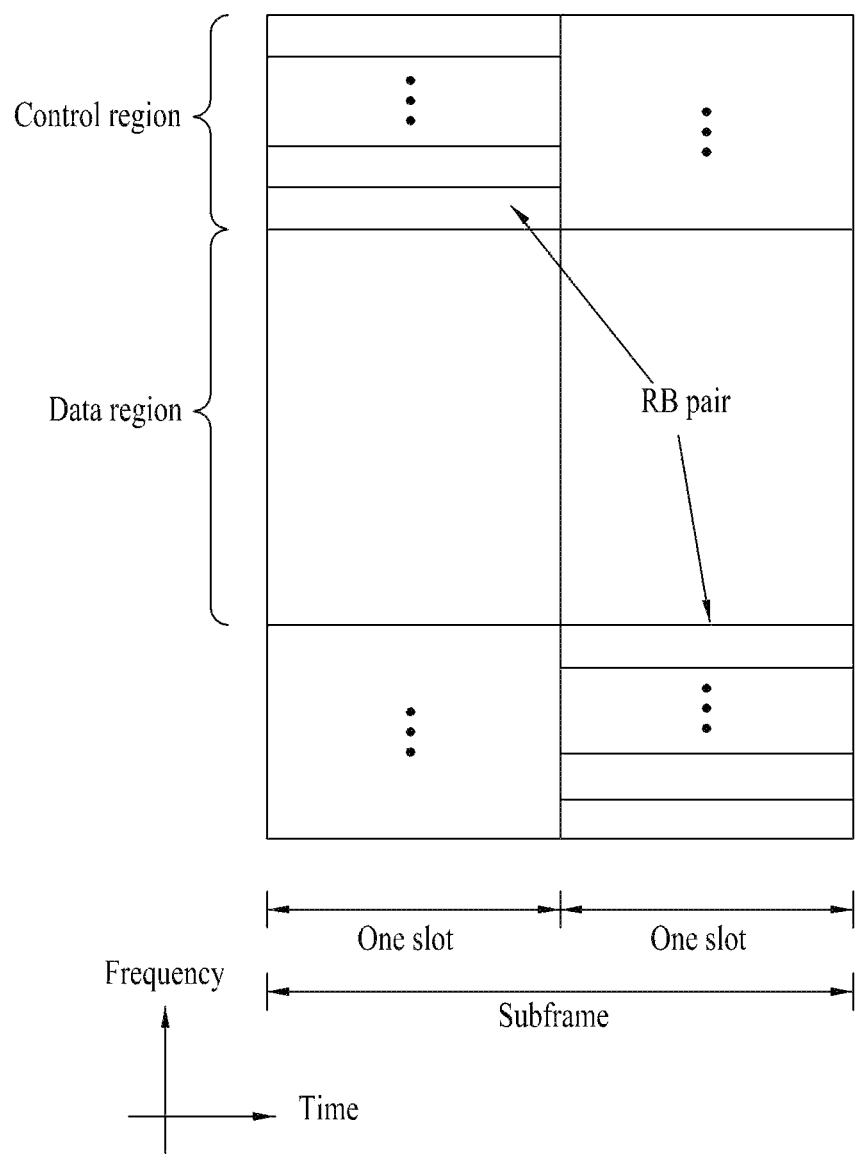
FIG. 7 is a diagram for an uplink subframe.

FIG. 7 is a diagram for a structure of an uplink (UL) subframe. A UL subframe may be divided into a control region and a data region in frequency domain. A physical UL control channel (PUCCH) including UL control information may be allocated to the control region. And, a physical UL shared channel (PUSCH) including user data may be allocated to the data region. In order to maintain single carrier property, one user equipment does not transmit PUCCH and PUSCH simultaneously. PUCCH for one user equipment may be allocated to a resource block pair (RB pair) in subframe. Resource blocks belonging to the resource block pair may occupy different subcarriers for 2 slots. Namely, a resource block pair allocated to PUCCH is frequency-hopped on a slot boundary.

Modeling of Multi-Antenna (MIMO) System

Figure 8:
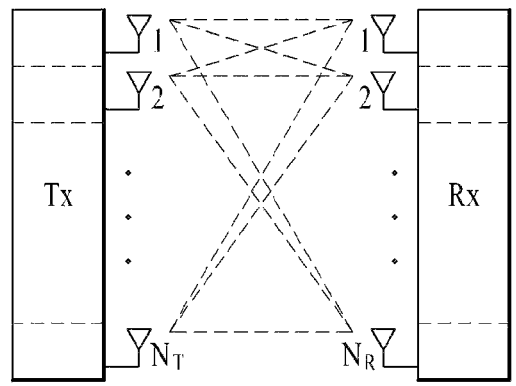
FIG. 8 is a diagram for a configuration of a wireless communication system including multiple antennas.
Figure 8:
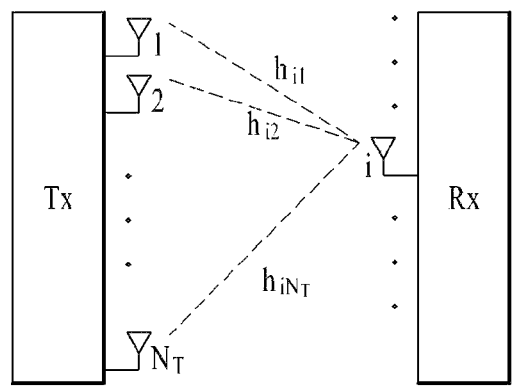

FIG. 8 is a diagram for a configuration of a wireless communication system including multiple antennas. Referring to FIG. 8(a), if the number of transmitting antennas is incremented into $N_T$ and the number of receiving antennas is incremented into $N_R$, theoretical channel transmission capacity is increased in proportion to the number of antennas unlike the case that a transmitter or receiver uses a plurality of antennas. Hence, a transmission rate may be enhanced and frequency efficiency may be remarkably raised. The transmission rate according to the increase of the channel transmission capacity may be theoretically raised by an amount resulting from multiplying a maximum transmission rate $R_0$ of the case of using a single antenna by a rate increasing rate $R_i$.

$$R_i = \min(N_T, N_R) \quad \text{Formula 1}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many efforts are ongoing to be made to various techniques for drive it into substantial data rate improvement. Some of theses techniques are already adopted as standards for various wireless communications such as 3 G mobile communications, a next generation wireless LAN and the like.

The trends for the MIMO relevant studies are explained as follows. First of all, many efforts are ongoing to be made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Assume that $N_T$ transmitting antennas and $N_R$ receiving antennas exist in this system.

First of all, a transmission signal is explained. If there are $N_T$ transmitting antennas, $N_T$ maximum transmittable informations exist. Hence, the transmission information may be represented as follows.

$$s = [s_1, s_2, \ldots, s_{N_T}]^T \quad \text{Formula 2}$$

Meanwhile, transmission power can be set different for each transmission information $s_1, s_2, \ldots, s_{N_T}$. If the respective transmission powers are set to $P_1, P_2, \ldots, P_{N_T}$, the transmission power adjusted transmission information may be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{Formula 3}$$

And, Ŝ may be represented as follows using a transmission power diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

If a weight matrix W is applied to the transmission power adjusted transmission information vector Ŝ, a case of configuring $N_T$ transmission signals $x_1, x_2, \ldots, x_{N_T}$ actually transmitted can be taken into consideration as follows. In this case, the weight matrix W plays a role in properly distributing each transmission information to each antenna according to a transmission channel status and the like. The $x_1, x_2, \ldots, x_{N_T}$ may be represented as followings using a vector X.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs. \quad \text{[Formula 5]}$$

In Formula 5, $w_{ij}$ indicates a weight between an $i^{th}$ transmitting antenna and a $j^{th}$ information. And, W may be called a precoding matrix.

When $N_R$ receiving antennas exist, if reception signals of the receiving antennas are set to $y_1, y_2, \ldots, y_{N_R}$, a reception signal vector can be represented as follows.

$$y = [y_1, y_2, \ldots, y_{N_R}]^T \quad \text{Formula 6}$$

If a channel is modeled in MIMO wireless communication system, the channel can be represented as an index of a transmitting antenna and an index of a receiving antenna. A channel between a transmitting antenna j and a receiving antenna i may be represented as $h_{ij}$. In the $h_{ij}$, it should be noted that a receiving antenna index is followed by a transmitting antenna index in order of index.

FIG. 8(b) shows a channel to a receiving antenna i from each of $N_T$ transmitting antennas. These channels may be represented as a vector or matrix in a manner of tying the channels b together. Referring to FIG. 7(b), the channels between the receiving antenna i and the $N_T$ transmitting antennas can be represented as follows.

$$h_i^T = [h_{i1}, h_{i2}, \ldots, h_{iN_T}] \quad \text{Formula 7}$$

Hence, at the channels arriving from $N_T$ transmitting antennas to $N_R$ relieving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Formula 8]}$$

In an actual channel, a transmission signal passes through a channel matrix H and then has AWGN (additive white Gaussian noise) added thereto. If white noses $n_1, n_2, \ldots, n_{N_R}$ respectively added to $N_R$ receiving antennas, the white noises $n_1, n_2, \ldots, n_{N_R}$ can be represented as follows.

$$n = [n_1, n_2, \ldots, n_{N_R}]^T \quad \text{Formula 9}$$

Hence, the reception signal vector may be expressed as follows through the above-mentioned formula modeling.

$$y = \begin{bmatrix} y_1 \\ y_2 \\ \vdots \\ y_i \\ \vdots \\ y_{N_R} \end{bmatrix} \quad \text{[Formula 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Meanwhile, the number of rows/columns of a channel matrix H indicating a channel state is dependent on the number of transmitting/receiving antennas. The number of rows in the channel matrix H is equal to the number $N_R$ of the receiving antennas. The number of columns in the channel matrix H is equal to the number $N_T$ of the transmitting antennas. In particular, the channel matrix H becomes $N_R \times N_T$ matrix.

A rank of matrix is defined as a minimum one of the number of independent rows and the number of independent columns. Hence, it may be impossible for a rank of matrix to become greater than the number of rows or columns. A rank (rank(H)) of a channel matrix H is restricted to the following.

$$\text{rank}(H) \leq \min(N_T, N_R) \quad \text{Formula 11}$$

For another definition of a rank, when Eigen value decomposition is performed on a matrix, a rank may be defined as the number of Eigen values except 0. Similarly, for a further definition of a rank, when singular value decomposition is performed, a rank may be defined as the number of singular values except 0. Hence, the physical meaning of a rank in a channel matrix may be regarded as a maximum number for sending different informations on a given channel.

In the description of this disclosure, 'rank' in MIMO transmission may indicate the number of paths for transmitting signals independently and 'number of layer(s)' may indicate the number of signal stream(s) transmitted via each path. Since a transmitting stage transmits layer amounting to the number of ranks used for signal transmission, a rank may have the same meaning of the number of layers unless mentioned especially.

Reference Signal (RS)

As mentioned in the forgoing description, a channel information is required to correct distortion of a packet transmitted in a wireless communication system. In order to acquire the channel information, it may be able to use a method of finding out channel information with a distortion extent when a reference signal, which is known to both a transmitting side and a receiving side, is transmitted.

In case of transmitting or receiving data using MIMO, a channel status between each transmitting antenna and each receiving antenna should be obtained to receive a correct signal. Hence, a separate reference signal needs to be present for each transmitting antenna. And, information for channel estimation and demodulation may be provided by a downlink reference signal (e.g., CRS and/or DMRS).

A receiving side (e.g., user equipment) estimates a state of a channel from CRS and may be able to feed back such an indicator related to a channel quality as CQI (Channel Quality Indicator); PMI (Precoding Matrix Index) and RI (Rank Indicator) to a transmitting side (e.g., base station). In this case, the CRS may be called a cell-specific reference signal.

Meanwhile, DMRS may be transmitted on a corresponding RE if demodulation of data on PDSCH is necessary. A user equipment many be informed of a presence or non-presence of DMRS by an upper layer. In particular, the user may be informed that the DMRS is valid only if the corresponding PDSCH is mapped. The DMRS may be called a UE-specific reference signal or a dedicated reference signal (DRS).

Figure 9:
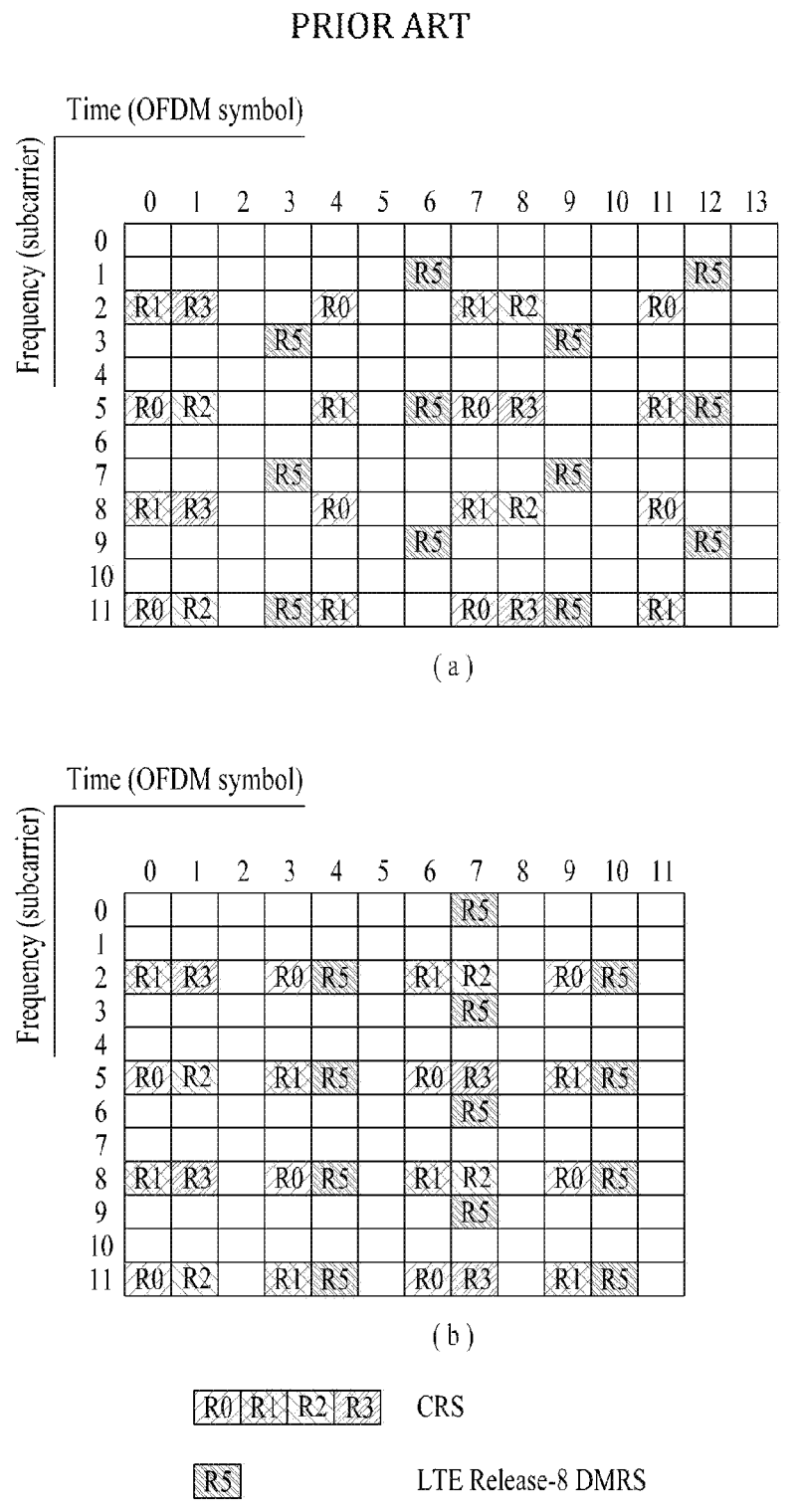

FIG. 9 shows that CRS and DMRS patterns defined by the conventional 3GPP LTE system (e.g., Release-8) are mapped on a downlink resource block. The downlink resource block, which is a unit for mapping a reference signal, may be represented as a unit of '1 subframe on time×12 subcarriers on frequency'. In particular, one resource block may have a length of 14 OFDM symbols on time in case of a normal CP [FIG. 8(a)] or a length of 12 OFDM symbols in case of an extended CP [FIG. 9(b)].

FIG. 9 shows a position of a reference signal on a resource block in a system having a base station support 4 transmitting antennas. In FIG. 9, resource elements (REs) indicated by R0, R1, R2 and R3 indicate positions of CRS for antenna port indexes 0, 1, 2 and 3, respectively. Meanwhile, a resource element indicated by 'R5' in FIG. 9 indicates a position of DMRS defined by the conventional LTE system (e.g., LTE Release-8).

In the following description, CRS is explained in detail.

First of all, CRS is used to estimate a channel of a physical antenna stage. The CRS is a reference signal receivable in common by all user equipments (UEs) in a cell and is distributed over a whole band. The CRS may be used for the purpose of channel state information (CSI) acquisition and data demodulation.

The CRS may be defined in various forms in accordance with antenna configuration of a transmitting side (e.g., base station). 3GPP LTE (e.g., Release-8) system supports various antenna configurations and a downlink signal transmitting side (e.g., base station) may have three kinds of antenna configurations including a single antenna, 2 transmitting antennas, 4 transmitting antennas and the like. In case that a base station performs a single antenna transmission, a reference signal for a single antenna port is arranged. In case that a base station performs 2-antenna transmission, reference signals for 2 antenna ports are arranged by time division multiplexing and/or frequency division multiplexing. In particular, the reference signals for 2 antenna ports are arranged on different time resources and/or different frequency resources to be discriminated from each other. In case that a base station performs 4-antenna transmission, reference signals for 4 antenna ports are arranged by TDM/FDM. Channel information estimated via CRS by a downlink signal receiving side (e.g., user equipment) may be used for demodulation of data transmitted by such a transmission scheme as Single Antenna Transmission, Transmit diversity, Closed-loop Spatial multiplexing, Open-loop Spatial multiplexing), Multi-User MIMO (MU-MIMO) and the like.

In case that MIMO is supported, when a reference signal is transmitted from a prescribed antenna port, a reference signal is carried on a resource element (RE) at a position designated in accordance with a reference signal pattern but any signal is not carried on a resource element (RE) at a position designated from another antenna port.

A rule for mapping CRS onto a resource block follows Formula 12.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Formula 12]}$$

$$v_{shift} = N_{ID}^{cell} \bmod 6$$

In Formula 12, k indicates a subcarrier index, l indicates a symbol index, and p indicates an antenna port index. $N_{symb}^{DL}$ indicates the number of OFDM symbols of one downlink slot, $N_{RB}^{DL}$ indicates the number of resource blocks allocated to downlink, $n_s$ indicates a slot index, and $N_{ID}^{cell}$ indicates a cell ID. 'Mod' means a modulo operation. A position of a reference signal in frequency domain depends on a value of $V_{shift}$. Since the $V_{shift}$ value depends on a cell ID as well, a position of a reference signal has a frequency shift value different per cell.

In particular, a position in frequency domain may be set to differ by being shifted in order to raise channel estimation performance through CRS. For instance, if a reference signal is situated at every 3 subcarriers, a prescribed cell enables the reference signal to be arranged on a subcarrier of 3 k and another cell enables the reference signal to be arranged on a subcarrier of 3 k+1. In viewpoint of one antenna port, a reference signal is arranged by 6-RE interval (i.e., 6-subcarrier interval) in frequency domain and maintains 3-RE interval in frequency domain from an RE on which a reference signal for another antenna port is arranged.

For the CRS, power boosting may be applicable. In this case, the power boosting means that a reference signal is transmitted with higher power in a manner of bringing power not from an RE allocated for the reference signal but from another RE among resource elements (REs) of one OFDM symbol.

A reference signal position in time domain is arranged by a predetermined interval by setting symbol index (I) 0 of each slot to a start point. A time interval is defined different in accordance with a CP length. In case of a normal CP, a reference signal is situated at a symbol index 0 of a slot and a reference signal is situated at a symbol index 4 of the slot. Reference signals for maximum 2 antenna ports are defined on one OFDM symbol. Hence, in case of 4-transmitting antenna transmission, reference signals for antenna ports 0 and 1 are situated at symbol indexes 0 and 4 (or symbol indexes 0 and 3 in case of an extended CP) of a slot, respectively and reference signals for antenna ports 2 and 3 are situated at symbol index 1 of the slot. Yet, frequency positions of the reference signals for the antenna ports 2 and 3 may be switched to ach other in a $2^{nd}$ slot.

In order to support spectral efficiency higher than that of the conventional 3GPP LTE (e.g., Release-8) system, it may be able to design a system (e.g., LTE-A) system having an extended antenna configuration. For instance, the extended antenna configuration may include an 8-transmitting antenna configuration. In the system having the extended antenna configuration, it may be necessary to support user equipments operating in the conventional antenna configuration. Namely, it may be necessary to support backward compatibility. Hence, it may be necessary to support a reference signal pattern according to the conventional antenna configuration and it may be necessary to design a new reference signal pattern for an additional antenna configuration. In this case, if CRS for a new antenna port is added to a system having a conventional antenna configuration, a reference signal overhead rapidly increases to lower a data rate. In consideration of this matter, there is an ongoing discussion on designing a new reference signal (CSI-RS) for a channel state information (CSI) measurement for the new antenna port.

In the following description, DMRS is explained in detail.

First of all, DMRS (or UE-specific reference signal) is a reference signal used for data demodulation. When MIMO transmission is performed, a precoding weight used for a specific user equipment in MIMO transmission is used for a reference signal as it is. Hence, when a user equipment receives a reference signal, it may be able to estimate an equivalent channel having a transmission channel combined with the precoding weight transmitted from each transmitting antenna.

The conventional 3GPP LTE system (e.g., Release-8) supports maximum 4-transmitting antenna transmission and DMRS for rank 1 beamforming is defined. The DMRS for the rank 1 beamforming may be represented as a reference signal (i.e., 'R5' in FIG. 9) for antenna port index 5. A rule for mapping DMRS on a resource block may follow Formula 13 and Formula 14. Formula 13 relates to a normal CP, while Formula 14 relates to an extended CP.

$$k = (k')\bmod N_{sc}^{RB} + N_{sc}^{RB} \cdot n_{PRB} \quad \text{[Formula 13]}$$
$$k' = \begin{cases} 4m' + v_{shift} & \text{if } l \in \{2, 3\} \\ 4m' + (2 + v_{shift})\bmod 4 & \text{if } l \in \{5, 6\} \end{cases}$$
$$l = \begin{cases} 3 & l' = 0 \\ 6 & l' = 1 \\ 2 & l' = 2 \\ 5 & l' = 3 \end{cases}$$
$$l' = \begin{cases} 0, 1 & \text{if } n_s\bmod 2 = 0 \\ 2, 3 & \text{if } n_s\bmod 2 = 1 \end{cases}$$
$$m' = 0, 1, \ldots, 3N_{RB}^{PDSCH} - 1$$
$$v_{shift} = N_{ID}^{cell}\bmod 3$$

$$k = (k')\bmod N_{sc}^{RB} + N_{sc}^{RB} \cdot n_{PRB} \quad \text{[Formula 14]}$$
$$k' = \begin{cases} 3m' + v_{shift} & \text{if } l = 4 \\ 3m' + (2 + v_{shift})\bmod 3 & \text{if } l = 1 \end{cases}$$
$$l = \begin{cases} 4 & l' \in \{0, 2\} \\ 1 & l' = 1 \end{cases}$$
$$l' = \begin{cases} 0 & \text{if } n_s\bmod 2 = 0 \\ 1, 2 & \text{if } n_s\bmod 2 = 1 \end{cases}$$
$$m' = 0, 1, \ldots, 4N_{RB}^{PDSCH} - 1$$
$$v_{shift} = N_{ID}^{cell}\bmod 3$$

In Formula 13 and Formula 14, k indicates a subcarrier index, l indicates a symbol index, and p indicates an antenna port index. $N_{SC}^{RB}$ indicates a resource block size in frequency domain and may be represented as the number of subcarriers. $n_{PRB}$ indicates a physical resource block number. And, $N_{RB}^{PDSCH}$ indicates a bandwidth of a resource block of a corresponding PDSCH transmission. $n_s$ indicates a slot index and $N_{ID}^{cell}$ indicates a cell ID. Moreover, 'mod' means a modulo operation. A position of a reference signal in frequency domain depends on a value of $V_{shift}$. Since the $V_{shift}$ value depends on a cell ID as well, a position of a reference signal has a frequency shift value different per cell.

Meanwhile, in a system of LTE-A (LTE-Advanced) evolved from 3GPP LTE, MIMO of high order, multi-cell transmission, advanced MU-MIMO and the like are taken into consideration. In order to support efficient reference signal management and advanced transmission scheme, DMRS based data demodulation is taken in to consideration. In particular, aside from DMRS (R5) for rank 1 beamforming defined by the conventional 3GPP LTE (e.g., Release-8), in order to support data transmission via an added antenna, it may be able to define DMRS for at least two layers. This DMRS may be preferably set to exist only in a resource block and layer on which a downlink transmission is scheduled by a base station.

In the following description, one example of DMRS pattern newly introduced into 3GPP LTE Release-9 or LTE Release 10 is explained with reference to FIG. 10.

Figure 10:
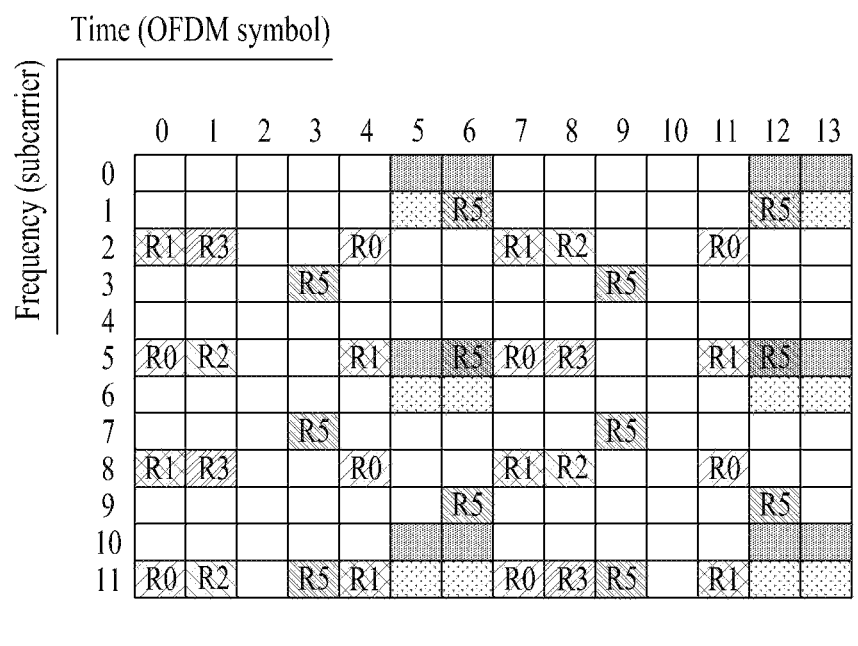
FIG. 10 is a diagram for one example of DMRS pattern introduced into 3GPP LTE Release-9/10 system.

FIG. 10 shows one example of a pattern of LTE Release-9/10 DMRS defined in addition to CRS (R0, R1, R2 and R3) and DMRS (R5) in case of the normal CP mentioned with reference to FIG. 9(a). In the pattern of LTE Release-9/10 DMRS, DMRS used in case of a low rank may be entirely arranged on 12 REs within one resource block or DMRS used in case of a high rank may be entirely arranged on 24 REs within one resource block. For instance, the LTE Release-9/10 DMRS pattern used in case of low rank is usable when a transmission rank is 1 or 2. For another instance, the LTE Release-9/10 DMRS pattern used in case of high rank is usable when a transmission rank ranges 3 to 8. For instance, the LTE Release-9/10 DMRS pattern used in case of low rank is usable when a transmission rank ranges 1 to 4. For another instance, the LTE Release-9/10 DMRS pattern used in case of high rank is usable when a transmission rank ranges 5 to 8. By these DMRS pattern, the present invention may be non-limited. And, it may be able to use a DMRS pattern suitable for a transmission rank.

When LTE Release-9/10 DMRS for supporting maximum rank-8 transmission is arranged on a radio resource, DMRSs for respective layers may be arranged in a manner of being multiplexed together. TDM (time division multiplexing) means that DMRSs for at least two layers are arranged on different time resources (e.g., OFDM symbols), respectively. FDM (frequency division multiplexing) means that DMRSs for at least two layers are arranged on different frequency resources (e.g., subcarriers), respectively. CDM (code division multiplexing) means that DMRSs for at least two layers arranged on the same radio resource are multiplexed together using orthogonal sequence (or, orthogonal covering).

Orthogonal cover code used for CDM multiplexing of DMRS may be abbreviated OCC. For instance, Walsh code, DFT (discrete Fourier transform) matrix or the like may be used as OCC.

Walsh code consists of a square matrix. And, it may be able to discriminate $2^n$ signals using Walsh code matrix. Moreover, Walsh code may consist of such a matrix as shown in Table 1.

TABLE 1

$$H_n = \begin{bmatrix} H_{n-1} & H_{n-1} \\ H_{n-1} & -H_{n-1} \end{bmatrix},$$

where $H_1 = 1$ $$H_2 = \begin{bmatrix} 1 & 1 \\ 1 & -1 \end{bmatrix},$$

$$H_3 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

DFT matrix consists of a square matrix and may be configured by N×N size, where N is a natural number). When DFT matrix is used as an orthogonal sequence for CDM of DRS, a normalization factor $1/\sqrt{N}$ may be omitted. DFT matrix may consist of such a matrix as shown in Table 2.

TABLE 2

$$D_N = \frac{1}{\sqrt{N}} \begin{bmatrix} 1 & 1 & \cdots & 1 \\ 1 & e^{j2\pi \frac{1 \cdot 1}{N}} & \cdots & e^{j2\pi \frac{1 \cdot (k-1)}{N}} \\ \vdots & \vdots & \ddots & \vdots \\ 1 & e^{j2\pi \frac{(n-1) \cdot 1}{N}} & \cdots & e^{j2\pi \frac{(n-1) \cdot (k-1)}{N}} \end{bmatrix}$$

$$D_1 = 1, \; D_2 = \frac{1}{\sqrt{2}} \begin{bmatrix} 1 & 1 \\ 1 & -1 \end{bmatrix}$$

$$D_3 = \frac{1}{\sqrt{3}} \begin{bmatrix} 1 & 1 & 1 \\ 1 & e^{j\frac{2\pi}{3}} & e^{j\frac{4\pi}{3}} \\ 1 & e^{j\frac{4\pi}{3}} & e^{j\frac{8\pi}{3}} \end{bmatrix}$$

$$D_4 = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

Figure 11:
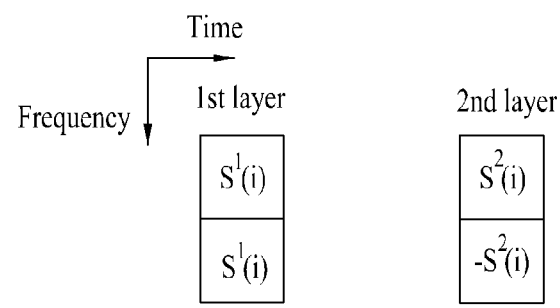
FIG. 11 and FIG. 12 are diagrams to describe code division multiplexing of DMRS using orthogonal cover code.
Figure 11:
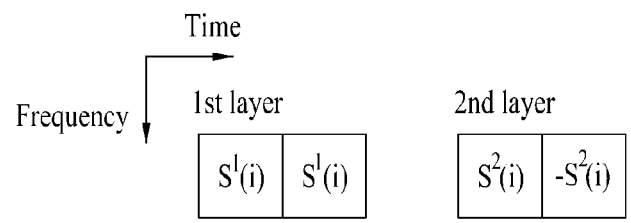
Figure 12:
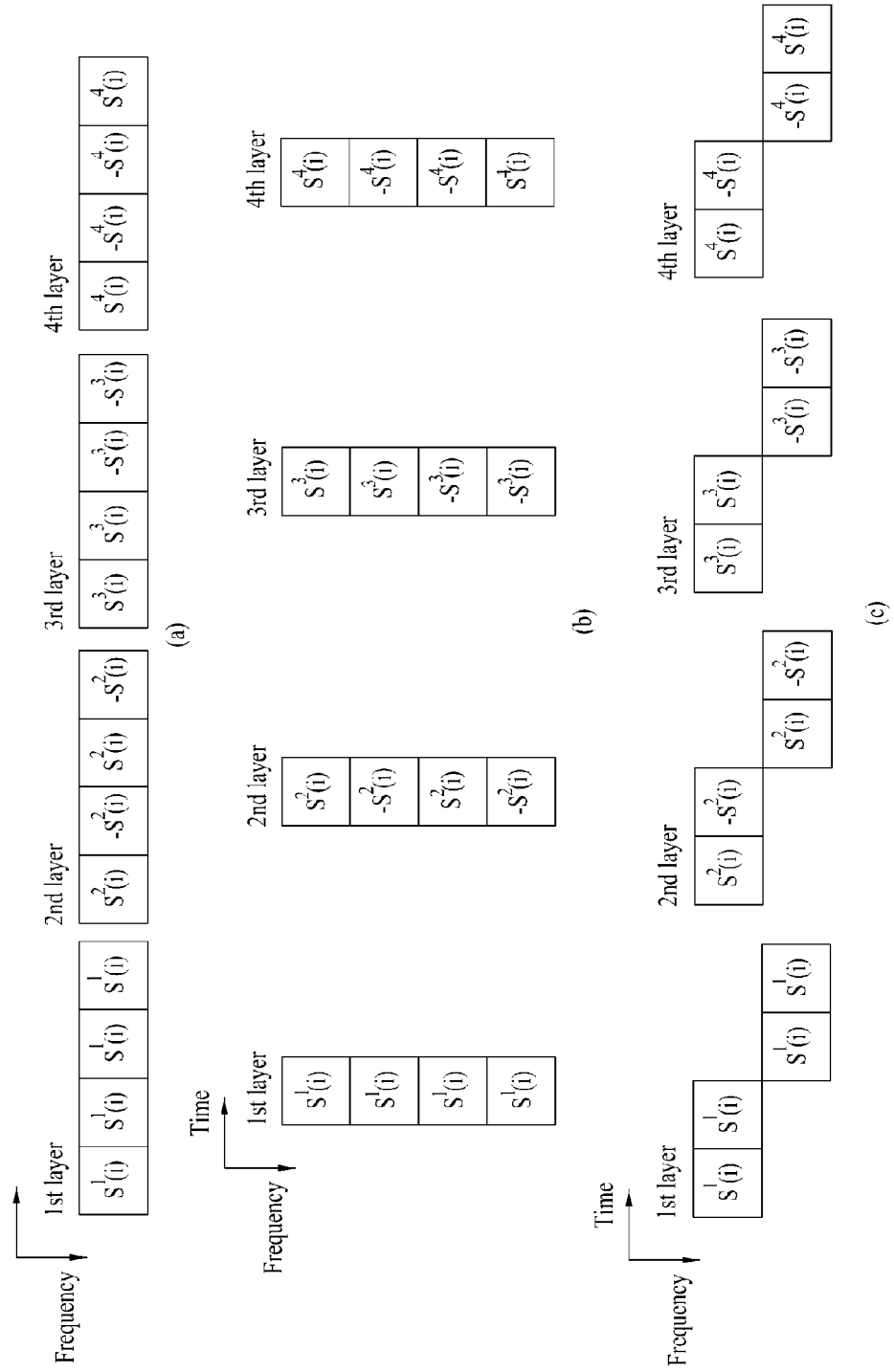

A scheme of multiplexing DMRS by CDM using a orthogonal cover is described with reference to FIG. 11 and FIG. 12. In FIG. 11 and FIG. 12, a sequence transmitted as DMRS is represented as S″(i) and 'n' indicates an index of a layer. In this case, the sequence S″(i) may become a specific code column or an arbitrary value.

One example of multiplexing DMRSs by CDM using OCC having a length 2 is described with reference to FIG. 11. Referring to FIG. 11(a), multiplexing may be performed between DMRSs existing at the same time positions and the different frequency positions using orthogonal covering. This may be called CDM-F multiplexing. FIG. 11(a) shows that DMRS arranged resource elements are contiguous with each other on frequency, by which the present invention may be non-limited. Alternatively, the DMRS arranged resource elements may not be contiguous with each other on frequency. In FIG. 11(a), the DMRS arranged resource element for a $1^{st}$ layer and the DMRS arranged resource element for a $2^{nd}$ layer indicate the resource element at the same position.

For instance, when DMRSs are applied to discriminate channels of two layers, at least two DMRSs may be usable. In order to estimate a channel of a $1^{st}$ layer, the same sequences $[S^1(i)]$ are carried on two DMRSs, respectively. Hence, $S^1(i)$ and $S^1(i)$ may be carried at two DMRS positions for the $1^{st}$ layer, respectively. This may be presented as the sequence carried at each of the two DMRS positions for the $1^{st}$ layer is multiplied by an orthogonal cover (1, 1) of a $1^{st}$ row of an orthogonal matrix [e.g., Walsh matrix ($H_2$) or DFT matrix ($D_2$)] having a size 2.

For another instance, in order to estimate a channel of a $2^{nd}$ layer, the same sequences $[S^2(i)]$ are carried on two DMRS, respectively. And, one (e.g., the DMRS indicated by 'B') of the two DMRSs may be multiplied by an orthogonal phase (e.g., −1). Hence, $S^2(i)$ and $-S^2(i)$ may be carried at two DMRS positions for the $2^{nd}$ layer, respectively. This may be presented as the sequence carried at each of the two DMRS positions for the $2^{nd}$ layer is multiplied by an orthogonal cover (1, −1) of a $2^{nd}$ row of an orthogonal matrix [e.g., Walsh matrix ($H_2$) or DFT matrix ($D_2$)] having a size 2. In this case, the sequence $[S^1(i)]$ for the $1^{st}$ layer may be equal to or different from the sequence $[S^2(i)]$ for the $2^{nd}$ layer.

Referring to FIG. 11(b), multiplexing may be performed between DMRSs existing at the same frequency position and the different time positions using orthogonal covering. This may be called CDM-T multiplexing. FIG. 11(b) shows that DMRS arranged resource elements are contiguous with each other on time, by which the present invention may be non-limited. Alternatively, the DMRS arranged resource elements may not be contiguous with each other on time. In FIG. 11(b), the DMRS arranged resource element for a $1^{st}$ layer and the DMRS arranged resource element for a $2^{nd}$ layer indicate the resource element at the same position.

For instance, in order to estimate a channel of a $1^{st}$ layer, the same sequences $[S^1(i)]$ are carried at two DMRS positions, respectively. In particular, $S^1(i)$ and $S^1(i)$ may be carried at two DMRS positions for the $1^{st}$ layer, respectively. This may be presented as the sequence carried at each of the two DMRS positions for the $1^{st}$ layer is multiplied by an orthogonal cover (1, 1) of a $1^{st}$ row of an orthogonal matrix [e.g., Walsh matrix ($H_2$) or DFT matrix ($D_2$)] having a size 2.

For another instance, in order to estimate a channel of a $2^{nd}$ layer, the same sequences $[S^2(i)]$ are carried on two DMRS, respectively. And, one (e.g., the DMRS indicated by 'B') of the two DMRSs may be multiplied by an orthogonal phase (e.g., −1). Hence, $S^2(i)$ and $-S^2(i)$ may be carried at two DMRS positions for the $2^{nd}$ layer, respectively. This may be presented as the sequence carried at each of the two DMRS positions for the $2^{nd}$ layer is multiplied by an orthogonal cover (1, −1) of a $2^{nd}$ row of an orthogonal matrix [e.g., Walsh matrix ($H_2$) or DFT matrix ($D_2$)] having a size 2.

Meanwhile, FIG. 12 shows a case that at least 4 DMRSs are used when DMRSs are transmitted to discriminate channels of 4 layers. Four DMRS positions may include four different OFDM symbols positions on the same subcarrier [CDM-T, FIG. 12(a)] or four different subcarrier positions on the same OFDM symbol [CDM-F, FIG. 12(b)]. Alternatively, four DMRS positions may include two different OFDM symbol positions on the same subcarrier and two different OFDM symbol positions on another subcarrier [CDM-T/F, FIG. 12(c)]. FIG. 12 shows that DMRS arranged resource elements are contiguous with each other on time or frequency, by which the present invention may be non-limited. And, DMRS arranged resource elements may not be contiguous with each other on time or frequency. For instance, referring to FIG. 10, DMRSs may be multiplexed by CDM-T across 2 contiguous OFDM symbol positions (i.e., OFDM symbol index 5 and OFDM symbol index 6) and other two contiguous OFDM symbol positions (i.e., OFDM symbol index 12 and OFDM symbol index 13) on the same subcarrier (i.e., subcarrier index 0). And, the DMRS arranged resource elements for $1^{st}$ to $4^{th}$ layers shown in FIG. 12 may indicate resource elements at the same positions, respectively.

When DMRSs are transmitted to discriminate channels of four layers, if four DMRSs are used, a row or column of DFT matrix ($D_4$) of a size 4 or a row or column of Walsh matrix ($H_3$) of a size 4 may be used as orthogonal covering.

For example, a case of using Walsh matrix ($H_3$) is described as follows. First of all, in order to estimate a channel of a $1^{st}$ layer, the same sequence [$S^1(i)$] is carried on 4 DMRSs and is multiplied by a $1^{st}$ row (1, 1, 1, 1) of Walsh matrix ($H_3$). In particular, $S^1(i)$, $S^1(i)$, $S^1(i)$ and $S^1(i)$ are carried at 4 DMRS positions, respectively. Secondly, in order to estimate a channel of a $2^{nd}$ layer, the same sequence [$S^2(i)$] is carried on 4 DMRSs and is multiplied by a $2^{nd}$ row (1, −1, 1, −1) of Walsh matrix ($H_3$). In particular, $S^2(i)$, −$S^2(i)$, $S^2(i)$ and −$S^2(i)$ are carried at 4 DMRS positions, respectively. Thirdly, in order to estimate a channel of a $3^{rd}$ layer, the same sequence [$S^3(i)$] is carried on 4 DMRSs and is multiplied by a $3^{rd}$ row (1, 1, −1, −1) of Walsh matrix ($H_3$). In particular, $S^3(i)$, $S^3(i)$, −$S^3(i)$ and −$S^3(i)$ are carried at 4 DMRS positions, respectively. Fourthly, in order to estimate a channel of a $4^{th}$ layer, the same sequence [$S^4(i)$] is carried on 4 DMRSs and is multiplied by a $4^{th}$ row (1, −1, −1, 1) of Walsh matrix ($H_3$). In particular, $S^4(i)$, −$S^4(i)$, −$S^4(i)$ and $S^4(i)$ are carried at 4 DMRS positions, respectively. In this case, $S^1(i)$, $S^2(i)$, $S^3(i)$ and $S^3(i)$ may include the sequences equal to or different from each other.

If a downlink transmission subject (e.g., a base station) transmits DMRS multiplexed by CDM in a manner of covering the DMRS using an orthogonal code, as mentioned in the above description, a receiving side reconstructs the DMRS for a corresponding layer by decovering (or dispreading) the corresponding DMRS using the orthogonal code and may be then able to estimate a corresponding channel.

The aforementioned description with reference to FIG. 11 relates to the example of multiplexing 2 DMRSs by CDM using OCC of a length 2 and the aforementioned description with reference to FIG. 12 relates to the example of multiplexing 4 DMRSs by CDM using OCC of a length 4, by which the present invention may be non-limited. And, the DMRS multiplexing by CDM may be achieved using OCC having a length (e.g., length 3) varying in accordance with a rank.

DMRS Pattern in DwPTS Subframe

In a frame structure of TDD type (i.e., Type 2), DwPTS length in a special subframe including DwPTS is different from a length of a normal subframe. For instance, in case of a normal CP, the DwPTS length may have 3-, 9-, 10-, 11- or 12-OFDM symbol length. For another instance, in case of an extended CP, the DwPTS length may have 3-, 7-, 8-, 9- or 10-OFDM symbol length. In case that DwPTS has 3-OFDM symbol length, data is not transmitted. Hence, DMRS is not required. In other cases, since the number of REs, on which DMRSs are arranged, is not sufficient, DMRS positions may be appropriately determined to avoid degradation of data demodulation performance.

Figure 13:
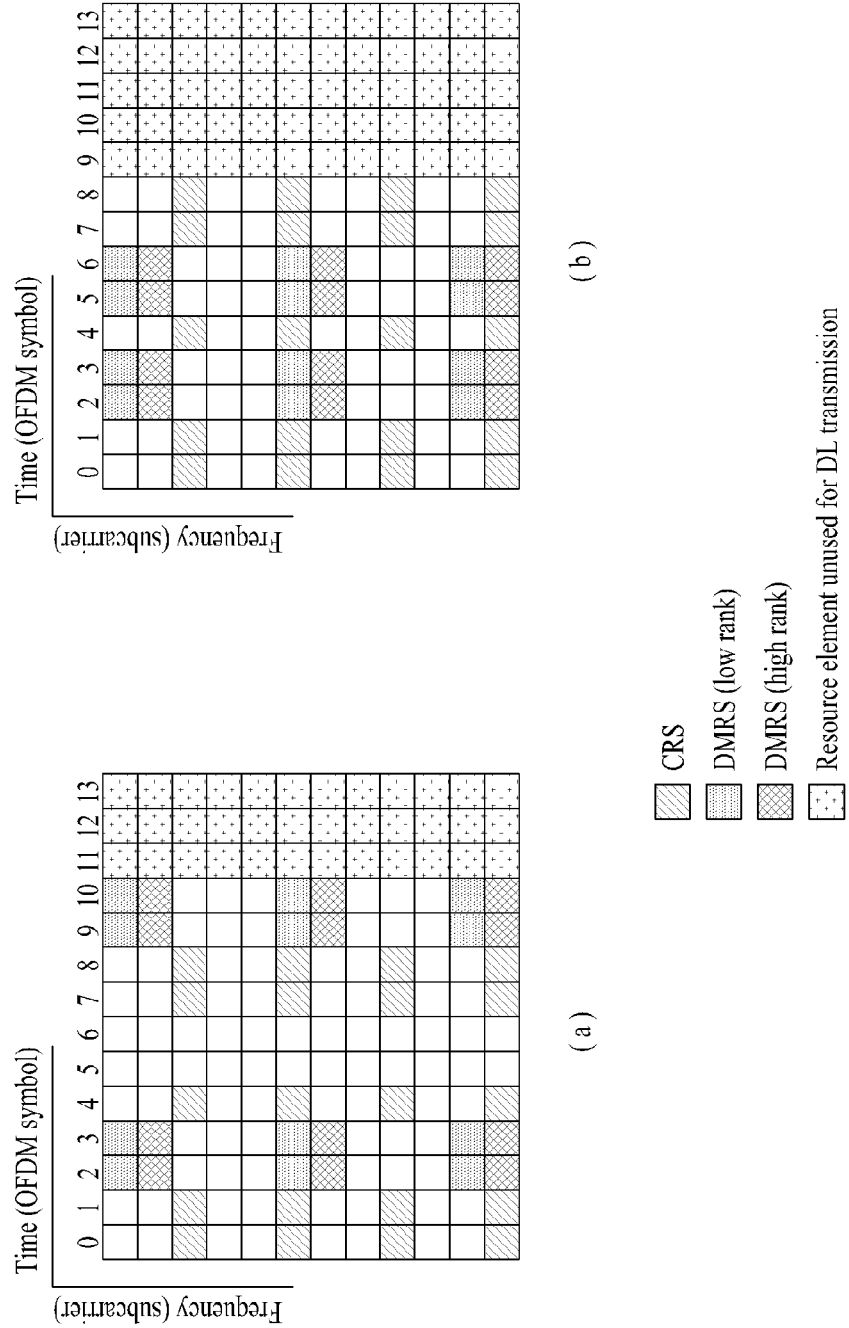
FIG. 13 is a diagram for one example of DMRS pattern in a special subframe including DwPTS.

FIG. 13 is a diagram for one example of DMRS pattern in a special subframe including DwPTS.

FIG. 13(a) shows DMRS pattern in case that DwPTS has 11- or 12-OFDM symbol length. In this case, DMRS may be arranged on symbol indexes 2, 3, 9 and 10 and may be represented as the DMRS pattern in a normal subframe described with reference to FIG. 10 is shifted on time (i.e., T-shift).

And, FIG. 13(b) shows DMRS pattern in case that DwPTS has 9- or 10-OFDM symbol length. In this case, DMRS may be arranged on symbol indexes 2, 3, 5 and 6 and may be represented as the DMRS pattern in a normal subframe described with reference to FIG. 10 is shifted on time (i.e., T-shift).

Primary Synchronization Signal

Primary synchronization signal (PSS) is the signal used for the initial cell search operation, in which a user equipment matches a synchronization with a base station, as described with reference to FIG. 1.

In FDD type (Type 1) radio frame structure, PSS may be carried on a last OFDM symbol in a slot index #0or a slot index #10.In TDD type (Type 2) radio frame structure, PSS may be carried on a $3^{rd}$ OFDM symbol in a slot index #1 or a slot index #6.

Power boosting may be performed on PSS to be easily detected by a user equipment located at a cell edge as well. In this case, the power boosting means that a transmission power of a resource element (6 RB), to which PSS is mapped, on a PSS carried OFDM symbol is increased by borrowing a transmission power of the rest of resource elements (i.e., the rest of physical resources in a frequency region on a corresponding OFDM symbol). By this power boosting, the transmission power of the rest of the resource elements may be deboosted, i.e., the transmission power may be decreased.

As mentioned in the foregoing description, in TDD type (Type 2) frame structure, PSS may be arranged on a $3^{rd}$ OFDM (i.e., OFDM symbol index 2) of DwPTS subframe. Moreover, as mentioned in the foregoing description with reference to FIG. 13, in case of DwPTS subframe in TDD type frame structure, DMRS may be arranged on a $3^{rd}$ OFDM symbol (i.e., OFDM symbol index 2). Therefore, by the transmission of PSS, the DMRS on the $3^{rd}$ OFDM symbol may have transmission power deboosted.

When DMRS is multiplexed across at least 2 OFDM symbols using OCC, in case that DMRS transmission power on some of OFDM symbols, on which DMRS is arranged, is deboosted, orthogonality by OCC may be broken. Hence, channel estimation performance through DMRS in a receiving side may be degraded.

DMRS transmission power deboosting in DwPTS subframe is described in detail with reference to FIG. 14 as follows.

First of all, DMRS in DwPTS subframe may be multiplexed across at least 2 OFDM symbols by CDM-T using OCC. For instance, referring to FIG. 14, DMRS may be multiplexed by CDM-T using an orthogonal cover code (OCC) having a length 2 across $3^{rd}$ and $4^{th}$ OFDM symbols in DwPTS subframe. Assuming that DMRS sequence for a layer index n is $S^n(i)$, for example, DMRS for a $1^{st}$ layer is covered with OCC (1, 1) so that $S^1(i)$ and $S^1(i)$ can be transmitted on $3^{rd}$ OFDM symbol and $4^{th}$ OFDM symbol, respectively. And, DMRS for a $2^{nd}$ layer is covered with OCC (1, −1) so that $S^2(i)$ and −$S^2(i)$ can be transmitted.

In case that DMRS transmission power is deboosted due to the aforementioned PSS transmission power boosting, orthogonality by OCC multiplied across 2 OFDM symbols may be broken. In particular, in case that OCC (1, 1) is multiplied across $3^{rd}$ and $4^{th}$ OFDM symbols for CDM multiplexing of DMRS, DMRS sequence is carried on the $3^{rd}$ OFDM symbol with a transmission power α due to the transmission power deboosting attributed to PSS transmission. Yet, since power deboosting does not occur in the $4^{th}$ OFDM symbol, DMRS sequence may be carried on the $4^{th}$ OFDM symbol with a transmission power due β(β>α). For instance, if α and β are 0.2 and 1, respectively, even if OCC (1, 1) is used, DMRS may be eventually transmitted with a transmission power of (0.2, 1). In this case, if DMRS is reconstructed by a receiving side using orthogonal code without considering power deboosting, as the orthogonality by OCC is broken, the receiving side may not reconstruct DMRS correctly and may not be able to estimate a channel correctly.

In particular, as the DMRS on the $3^{rd}$ OFDM symbol (i.e., OFDM symbol index 2) in the DwPTS subframe is deprived of its transmission power by the PSS, if the DMRS transmission power level on the $3^{rd}$ OFDM symbol becomes α and the DMRS transmission power level on another OFDM symbol (e.g., OFDM symbol index 3, OFDM symbol index 9 and OFDM symbol index 10) becomes β, the transmission powers of the DMRSs multiplexed using OCC become different from each other. Hence, the orthogonality by OCC may be broken. In the following description, embodiments of the present invention for solving the problems of the DMRS transmission power deboosting due to the PSS transmission in DwPTS subframe are explained.

1st Embodiment

According to a $1^{St}$ embodiment, DMRS transmission subject (e.g., base station) may inform a DMRS reception subject (e.g., user equipment) of information on a value of DMRS transmission power (i.e., α) power deboosted by PSS transmission in DwPTS subframe. Moreover, the DMRS transmission subject may be able to inform the DMRS reception subject of information on a difference value (i.e., |α−β|) between the power deboosted DMRS transmission power and a different DMRS transmission power or information on a ratio (i.e., α/(β) of the power deboosted DMRS transmission power to the different DMRS transmission power. According to the $1^{st}$ embodiment, transmission power information may be provided in a manner of being DMRS reception subject-specific (i.e., UE-specific).

Using the aforementioned information, the DMRS reception subject equalizes (i.e., normalizes) the power of the received DMRS and may be then able to correctly de-spread the DMRS.

2nd Embodiment

According to a $2^{nd}$ embodiment, DMRS transmission subject (e.g., base station) may be able to cell-specifically provide information on DMRS transmission power, which is power deboosted by PSS transmission, in DwPTS subframe. Generally since downlink power allocation is configured cell-specifically, it may be appropriate that DMRS transmission power information is cell-specifically provided as well.

In particular, DMRS transmission power information may be provided using a physical broadcast channel (PBCH), a dynamic broadcast channel (PDSCH), RRC signaling, PDCCH or MAC message.

The DMRS transmission power information may include information on a value of DMRS transmission power (i.e., α) power-deboosted by PSS transmission in DwPTS subframe, information on a difference value (i.e., |α−β|) between a power deboosted DMRS transmission power and a different DMRS transmission power, or information on a ratio (i.e., α/β) of a power deboosted DMRS transmission power to a different DMRS transmission power.

Using the aforementioned information, the DMRS reception subject equalizes (i.e., normalizes) the power of the received DMRS and may be then able to correctly de-spread the DMRS.

3rd Embodiment

According to a $3^{rd}$ embodiment, it may consider a case that DMRS transmission power (i.e., α) power deboosted by PSS transmission in DwPTS subframe is fixed. If α is fixed, it may mean that a PSS power boosting level does not change in accordance with cell coverage or the like and that power deboosted DMRS transmission power is not changed correspondingly. Hence, the power deboosted DMRS transmission power α may be acquired by a DMRS receiving side by a predetermined rule (e.g., a fixed value).

Accordingly, although DMRS transmission subject does not signal the DMRS transmission power information separately, DMRS reception subject may acquire DMRS power level information by a predetermined rule and may despread DMRS correctly by equalizing (i.e., normalizing) power of the received DMRS.

The aforementioned various embodiments of the present invention may effectively apply to all cases of multiplexing DMRS by CDM-T using OCC of length 2 in time domain across $3^{rd}$ and $4^{th}$ OFDM symbols in DwPTS subframe.

The aforementioned principles of the present invention may identically apply to a case of multiplexing DMRS by CDM-T using OCC of length 3 or 4 across 3 or 4 OFDM symbols. In particular, in case that DMRSs are multiplexed by CDM-T using OCC across an OFDM symbol (i.e., OFDM symbol index 2) having power deboosting occur due to PSS transmission in DwPTS subframe and a different OFDM symbol(s) (i.e., OFDM symbol index 3, OFDM symbol index 9 and OFDM symbol index 10), orthogonality by the OCC may be broken. Hence, DMRS transmission power information is provided in accordance with the aforementioned principle of the present invention, thereby supporting correct operation in DMRS reception subject.

In the above description, a transmission power level (α) of DMRS transmission-power-deboosted by PSS transmission in DwPTS subframe is provided as DMRS transmission power information. On the contrary, DMRS reception side may be provided with a power boosting extent of PSS to acquire the power deboosted DMRS transmission power level (α) indirectly.

Figure 14:
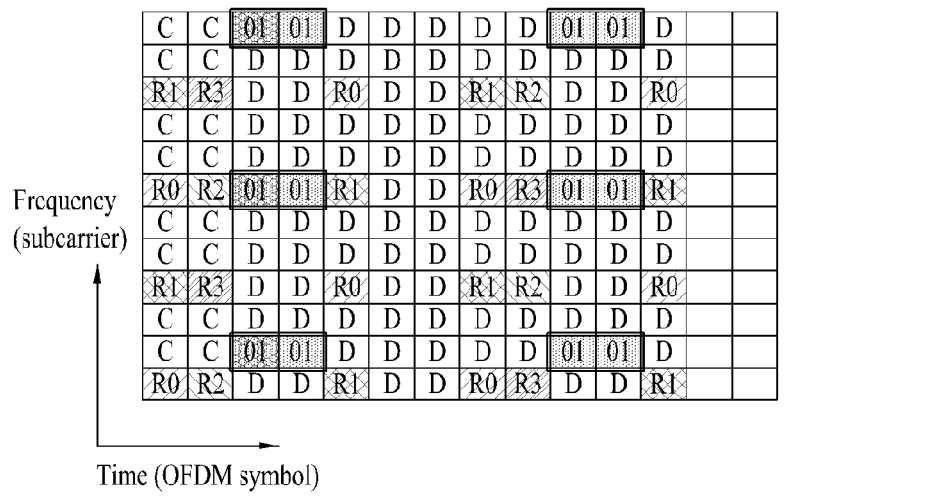
FIG. 14 is a diagram to describe DMRS transmission power deboosting in DwPTS subframe.

FIG. 14 exemplarily shows the DMRS pattern and the power deboosting in case that DwPTS has 12-OFDM symbol length, by which the present invention may be non-limited. And, the aforementioned various embodiments of the present invention may apply to a case that orthogonality of OPCC is broken due to DMRS transmission power deboosting by PSS transmission in case of DwPTS having a different length.

Moreover, in a wireless network including a relay node, a DMRS transmission subject may include a base station or a relay node as a downlink transmission subject and a DMRS reception subject may include a user equipment or a relay node as a downlink reception subject. Besides, the aforementioned proposals of the present invention may identically apply to relay node operations.

Figure 15:
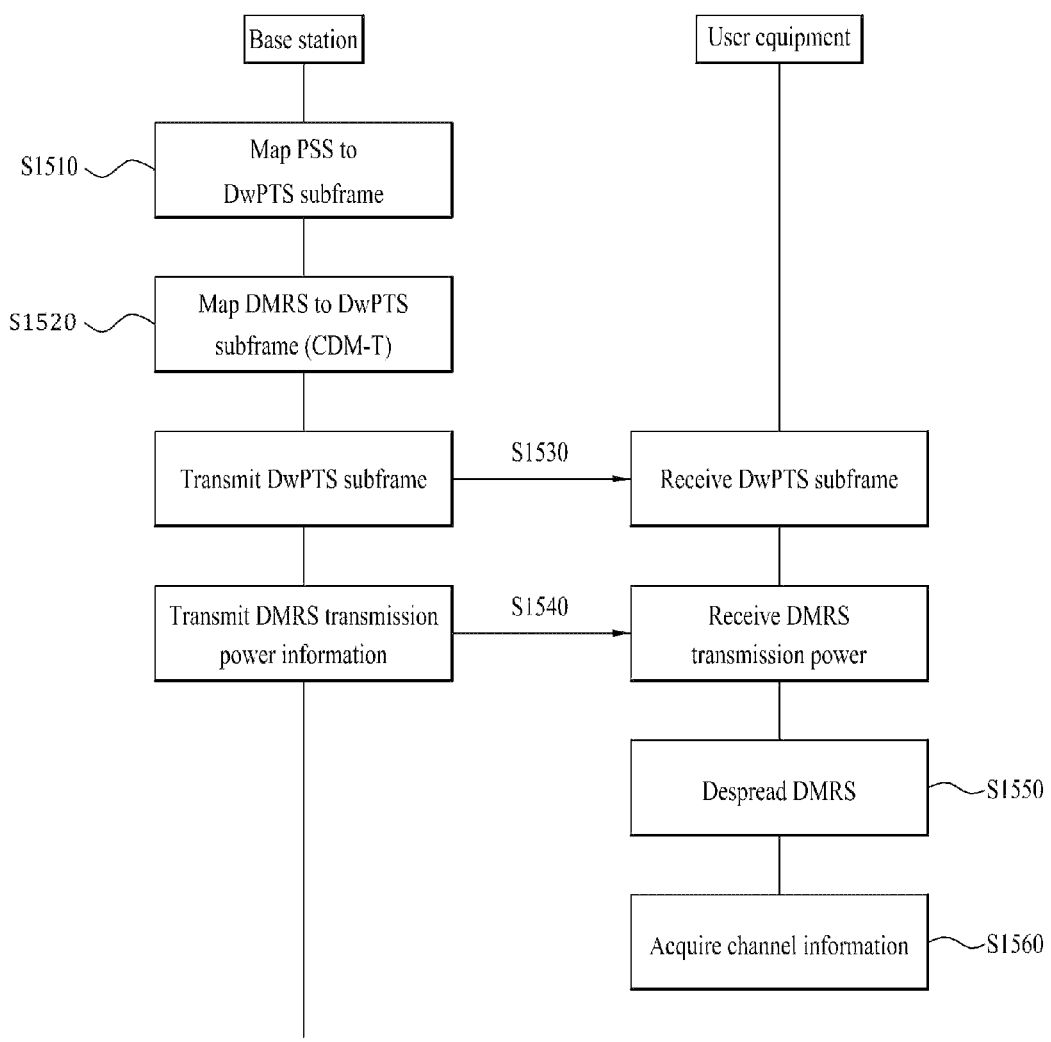
FIG. 15 is a diagram to describe a DMRS transmission power information providing method and a channel information acquiring method according to the present invention.

FIG. 15 is a diagram to describe a DMRS transmission power information providing method and a channel information acquiring method according to the present invention.

In a step S1510, a base station maps PSS to a $3^{rd}$ OFDM symbol (OFDM symbol index 2) of DwPTS subframe and may be ale to set power boosting of a PSS mapped resource element.

In a step S1520, the base station may be able to multiplex and map DMRSs across at least 2 OFDM symbols (e.g., OFDM symbol index 2 and OFDM symbol index 3) including the $3^{rd}$ OFDM symbol (OFDM symbol index 2) of the DwPTS subframe by CDM-T using OCC of length 2 or more. In doing so, due to the PSS power boosting in the step S1510, the transmission power of the DMRS mapped to the $3^{rd}$ OFDM symbol is deboosted.

In a step S1530, the base station transmits the DwPTS subframe, in which the PSS and the DMRS are mapped in the above manner, to a user equipment. In a step S1540, the base station may be able to provide the user equipment with transmission power information on the DMRS (i.e., the transmission power deboosted DMRS) on the $3^{rd}$ OFDM symbol in the step S1520. Hence, the user equipment may be able to receive the DwPTS subframe and the DMRS transmission power information.

In a step S1550, the user equipment may despread the DMRS received in the DwPTS subframe based on the received DMRS transmission power information. In doing so, the user equipment performs normalization with a transmission power of DMRS mapped to a different OFDM symbol in consideration of a power deboosting level of the DMRS carried on the $3^{rd}$ OFDM symbol of DwPTS, thereby dispreading the DMRS correctly by maintaining the orthogonality by OCC.

In a step S1560, the user equipment may acquire channel information from the despread DMRS.

The aforementioned DMRS transmission power information may include at least one of a DMRS transmission power level ($\alpha$) on $3^{rd}$ OFDM symbol of DwPTS subframe, a difference value ($|\alpha-\beta|$) between a DMRS transmission power level on $3^{rd}$ OFDM symbol of DwPTS subframe and a DMRS transmission power level on the rest of OFDM symbol and a ratio ($\alpha/\beta$) of a DMRS transmission power on $3^{rd}$ OFDM symbol of DwPTS subframe to a DMRS transmission power on the rest of OFDM symbol.

Although a method according to one embodiment of the present invention performed by a base station and a user equipment is described with reference to FIG. 15 for clarity, it is apparent that the aforementioned various embodiments of the present invention may apply to the corresponding details.

Figure 16:
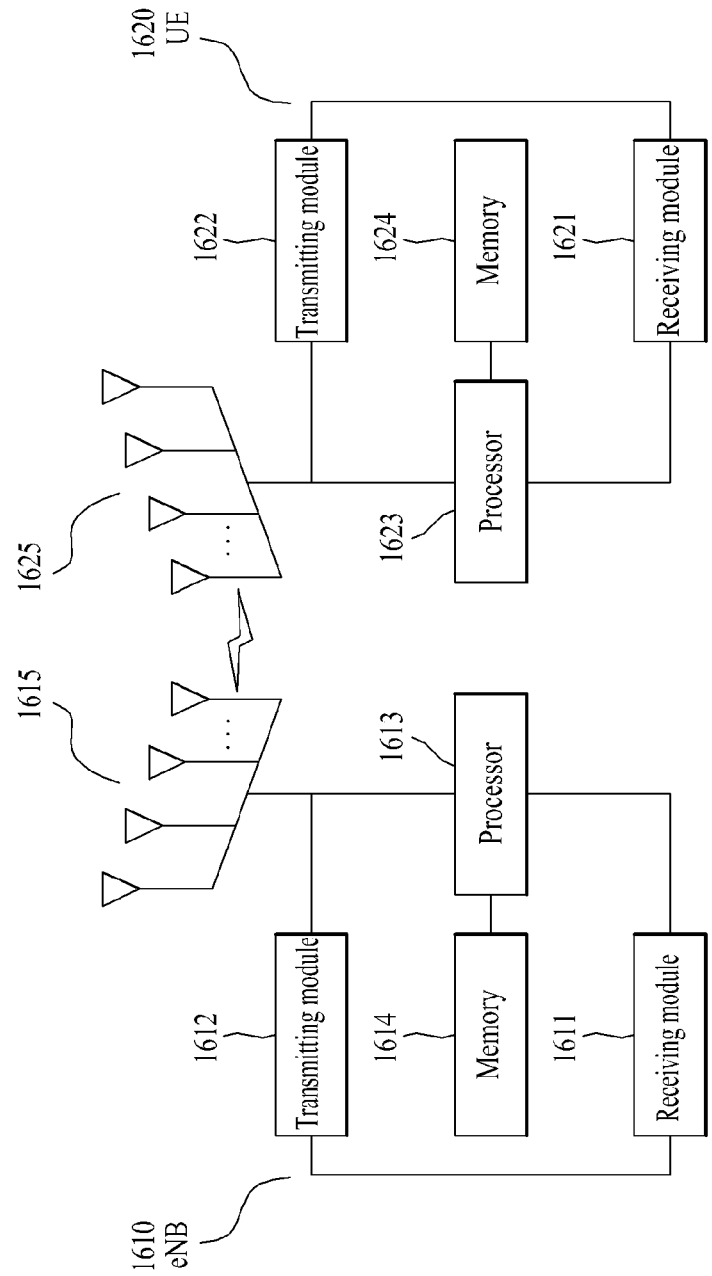
FIG. 16 is a diagram for configuration of a preferred embodiment of the present invention for a user equipment device and a base station device according to the present invention.

FIG. 16 is a diagram for configuration of a preferred embodiment of the present invention for a user equipment device and a base station device according to the present invention.

Referring to FIG. 16, a base station device 1610 according to the present invention may include a receiving module 1611, a transmitting module 1612, a processor 1613, a memory 1614 and a plurality of antennas 1615. In this case, a plurality of the antennas may mean a base station that supports MIMO transmission and reception.

The receiving module 1611 may receive various signals, data, information and the like from a user equipment and the like in uplink. The transmitting module 1612 may transmit various signals, data, information and the like to the user equipment and the like in downlink. And, the processor 1613 may be configured to control overall operations of the base station device 1610.

The processor 1613 may map PSS to a $3^{rd}$ OFDM symbol of DwPTS subframe and map DMRS across at least 2 OFDM symbols including the $3^{rd}$ OFDM symbol in the DwPTS subframe. Due to power boosting of PSS, a transmission power of the DMRS on the $3^{rd}$ OFDM symbol may be deboosted. And, the processor 1623 may control the transmitting module 1622 to transmit the PSS and DMRS mapped DwPTS subframe and the transmission power information of the DMRS mapped to the $3^{rd}$ OFDM symbol to the user equipment.

The processor 1613 of the base station device 1613 performs a function of operating information received by the base station device, information to be externally transmitted and the like. The memory 1614 may be able to store the operated information and the like for prescribed duration and may be substituted with such a component as a buffer (not shown in the drawing) and the like.

Meanwhile, referring to FIG. 16, a user equipment 1620 according to the present invention may include a receiving module 1621, a transmitting module 1622, a processor 1623, a memory 1624 and a plurality of antennas 1625. In this case, a plurality of the antennas may mean a user equipment that supports MIMO transmission and reception.

The receiving module 1621 may receive various signals, data, information and the like from a base station in downlink. The transmitting module 1622 may transmit various signals, data, information and the like to the base station in uplink. And, the processor 1623 may be configured to control overall operations of the user equipment 1620.

The processor 1623 may control the receiving module 1621 to receive DwPTS subframe, in which a primary synchronization signal is mapped to a $3^{rd}$ OFDM symbol of DwPTS subframe and DMRSs are mapped across at least 2 OFDM symbols including the $3^{rd}$ OFDM symbol by CDM-T, and transmission power information of the DMRS mapped to the $3^{rd}$ OFDM symbol. Based on the received DMRS transmission power information, the processor 1623 may be configured to despread the received DMRS in the DwPTS subframe and acquire channel information from the despread DMRS.

The processor 1623 of the user equipment performs a function of operating information received by the user equipment, information to be externally transmitted by the user equipment and the like. The memory 1624 may be able to store the operated information and the like for prescribed duration and may be substituted with such a component as a buffer (not shown in the drawing) and the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description may be applicable to various kinds of mobile communication systems.

What is claimed is:

1. A method of providing demodulation reference signal transmission power information, comprising the steps of:
    mapping a primary synchronization signal to a prescribed OFDM symbol of DwPTS (downlink pilot time slot) subframe;
    mapping the demodulation reference signal across at least 2 OFDM symbols including the prescribed OFDM symbol in the DwPTS subframe by a code division multiplexing scheme;
    transmitting the DwPTS subframe to which the primary synchronization signal and the demodulation reference signal are mapped; and
    transmitting transmission power information of the demodulation reference signal mapped to the prescribed OFDM symbol.

2. The method of claim 1, wherein the primary synchronization signal is power boosted.

3. The method of claim 1, wherein the demodulation reference signal on the prescribed OFDM symbol is power deboosted.

4. The method of claim 1, wherein the transmission power information of the demodulation reference signal comprises at least one selected from the group consisting of a transmission power level of the demodulation reference signal on the prescribed OFDM symbol, a difference value between a transmission power level of the demodulation reference signal on the prescribed OFDM symbol and a transmission power level of the demodulation reference signal on the rest of the OFDM symbol, and a ratio of the transmission power level of the demodulation reference signal on the prescribed OFDM symbol to the transmission power level of the demodulation reference signal on the rest of the OFDM symbol.

5. The method of claim 1, wherein the code division multiplexing scheme uses an orthogonal cover code (OCC) having a length 2 or more.

6. The method of claim 1, wherein the prescribed OFDM symbol comprises a 3rd OFDM symbol of the DwPTS subframe.

7. A method of acquiring channel information using a demodulation reference signal, comprising the steps of:
    receiving DwPTS (downlink pilot time slot) subframe having the demodulation reference signal mapped by a code division multiplexing scheme across at least 2 OFDM symbols including a prescribed OFDM symbol to which a primary synchronization signal is mapped;
    receiving transmission power information of the demodulation reference signal mapped to the prescribed OFDM symbol;
    despreading the received demodulation reference signal based on the transmission power information of the demodulation reference signal; and
    acquiring the channel information from the despread demodulation reference signal.

8. The method of claim 7, the demodulation reference signal despreading step comprising the step of normalizing a power of the demodulation reference signal mapped to the at least 2 OFDM symbols from the transmission power information of the demodulation reference signal.

9. The method of claim 7, wherein the primary synchronization signal is power boosted.

10. The method of claim 7, wherein the demodulation reference signal on the prescribed OFDM symbol is power deboosted.

11. The method of claim 7, wherein the transmission power information of the demodulation reference signal comprises at least one selected from the group consisting of a transmission power level of the demodulation reference signal on the prescribed OFDM symbol, a difference value between a transmission power level of the demodulation reference signal on the prescribed OFDM symbol and a transmission power level of the demodulation reference signal on the rest of the OFDM symbol, and a ratio of the transmission power level of the demodulation reference signal on the prescribed OFDM symbol to the transmission power level of the demodulation reference signal on the rest of the OFDM symbol.

12. The method of claim 7, wherein the code division multiplexing scheme uses an orthogonal cover code (OCC) having a length 2 or more.

13. The method of claim 7, wherein the prescribed OFDM symbol comprises a 3rd OFDM symbol of the DwPTS subframe.

14. A base station for providing demodulation reference signal transmission power information, comprising:
    a receiving module configured to receive an uplink signal from a user equipment;
    a transmitting module configured to transmit a downlink signal to the user equipment; and
    a processor connected to the receiving module and the transmitting module, the processor configured to control the base station including the receiving module and the transmitting module,
    wherein the processor is further configured to:
        map a primary synchronization signal to a prescribed OFDM symbol of DwPTS (downlink pilot time slot) subframe,
        map the demodulation reference signal across at least 2 OFDM symbols including the prescribed OFDM symbol in the DwPTS subframe by a code division multiplexing scheme, and
        transmit the DwPTS subframe to which the primary synchronization signal and the demodulation reference signal are mapped and transmission power information of the demodulation reference signal mapped to the prescribed OFDM symbol via the transmitting module.

15. A user equipment for acquiring channel information using a demodulation reference signal, comprising:
    a receiving module configured to receive a downlink signal from a base station;

a transmitting module configured to transmit an uplink signal to the user equipment; and a processor connected to the receiving module and the transmitting module, the processor configured to control the user equipment including the receiving module and the transmitting module, wherein the processor is further configured to:

receive DwPTS (downlink pilot time slot) subframe having the demodulation reference signal mapped by a code division multiplexing scheme across at least 2 OFDM symbols including a prescribed OFDM symbol to which a primary synchronization signal is mapped via the receiving module, the processor configured to receive transmission power information of the demodulation reference signal mapped to the prescribed OFDM symbol via the receiving module, despread the received demodulation reference signal based on the transmission power information of the demodulation reference signal, and acquire the channel information from the despread demodulation reference signal.

* * * * *